US008588093B2

(12) United States Patent
Yoneda et al.

(10) Patent No.: US 8,588,093 B2
(45) Date of Patent: Nov. 19, 2013

(54) STREAMING COMMUNICATION DEVICE, STREAMING COMMUNICATION METHOD, AND STREAMING COMMUNICATION SYSTEM

(75) Inventors: Takahiro Yoneda, Tokyo (JP); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 13/002,051

(22) PCT Filed: Jul. 3, 2009

(86) PCT No.: PCT/JP2009/003107
§ 371 (c)(1),
(2), (4) Date: Dec. 30, 2010

(87) PCT Pub. No.: WO2010/001625
PCT Pub. Date: Jan. 7, 2010

(65) Prior Publication Data
US 2011/0110260 A1    May 12, 2011

(30) Foreign Application Priority Data
Jul. 4, 2008 (JP) ................................. 2008-176343

(51) Int. Cl.
*G01R 31/08* (2006.01)

(52) U.S. Cl.
USPC ........... 370/252; 370/231; 370/232; 370/235; 370/394; 370/516

(58) Field of Classification Search
USPC ......... 370/229, 252, 389, 901, 912, 231, 232, 370/235, 394, 516
See application file for complete search history.

(56) References Cited

U.S. PATENT DOCUMENTS 6,842,424 B1    1/2005 Key et al.
6,922,390 B1    7/2005 Chapman et al.
(Continued)

FOREIGN PATENT DOCUMENTS

CN    1492630 A    4/2004
CN    1643875 A    7/2005
(Continued)

OTHER PUBLICATIONS

International Search Report issued Oct. 6, 2009 in International (PCT) Application No. PCT/JP2009/003107.
(Continued)

*Primary Examiner* — Christopher Grey
*Assistant Examiner* — Natali N Pascual Peguero
(74) *Attorney, Agent, or Firm* — Wenderoth, Lind & Ponack, L.L.P.

(57) ABSTRACT

A streaming communication device accurately estimates a packet which will be lost in the future. A streaming communication device which transmits or receives a stream via a router over a packet-switched network includes: accumulating unit configured to accumulate a one-way delay that is a time period between transmission and reception of a packet which includes a small segment of the stream; a detecting unit configured to detect a sign of a packet loss by identifying a tendency toward an increase in the one-way delay accumulated in the accumulating unit; and an estimating unit configured to estimate, when the sign is detected, a loss packet from a degree of the increase in the one-way delay accumulated in the accumulating unit, the loss packet being a packet which will be lost.

17 Claims, 27 Drawing Sheets

(56) References Cited

U.S. PATENT DOCUMENTS

| | | | |
|---|---|---|---|
| 7,539,925 B2* | 5/2009 | Yamane | 714/774 |
| 2004/0052259 A1 | 3/2004 | Garcia et al. | |
| 2005/0286416 A1* | 12/2005 | Shimonishi et al. | 370/229 |
| 2009/0161546 A1 | 6/2009 | Key et al. | |

FOREIGN PATENT DOCUMENTS

| | | |
|---|---|---|
| CN | 1739310 A | 2/2006 |
| CN | 1981493 A | 6/2007 |
| JP | 10-200581 | 7/1998 |
| JP | 2001-024678 | 1/2001 |
| JP | 2001-069170 | 3/2001 |
| JP | 2002-124991 | 4/2002 |
| JP | 2004-172706 | 6/2004 |
| JP | 2006-101275 | 4/2006 |
| JP | 2006-340078 | 12/2006 |
| WO | 03/084172 | 10/2003 |
| WO | 2004/064424 | 7/2004 |
| WO | 2005/109792 | 11/2005 |
| WO | WO 2008021470 A2 * | 2/2008 |

OTHER PUBLICATIONS

T. Kushida et. al., "Characteristics of inter-arrival packets and losses on the end-to-end path of the Internet", IPSJ SIG Notes, vol. 2002, No. 54, 2002-DSP-108-12, Jun. 2002, pp. 67-72.

* cited by examiner

FIG. 11

| Router | Packet loss occurred or not | OWD at time of packet loss [100 $\mu$s] |
|--------|-----------------------------|------------------------------------------|
| 1 | Yes | 200 |
| 2 | No | — |
| 3 | Yes | 170 |
| ⋮ | ⋮ | ⋮ |

STREAMING COMMUNICATION DEVICE, STREAMING COMMUNICATION METHOD, AND STREAMING COMMUNICATION SYSTEM

TECHNICAL FIELD

The present invention relates to streaming communication devices and so on that transmit or receive streams via a router over a packet-switched network.

BACKGROUND ART

As indicated by the term High-Definition (HD), video content is becoming increasingly higher in resolution and image quality. Furthermore, audio and music content is achieving higher sound quality. With such developments, content distributed over a packet-switched network (hereinafter referred to as network) is achieving higher quality.

Distribution of content such as video and audio/music over the network can be broadly classified into three forms. The first is a form which does not require real-time distribution, represented by downloading of video or music files. The second is a form which requires semi-real-time distribution, represented by Video On Demand (VOD). The third is a form which requires real-time distribution, represented by bidirectional communication and live video distribution used in teleconference systems, for example. Particularly when real-time content distribution is required, a strict restriction applies to the delay time allowed between the content distribution and completion of content playback.

Next, the real-time distribution of high-quality content over a best-effort network is discussed. Hereinafter, the side from which the content is distributed is referred to as a transmitting node, and the side which plays back the content is referred to as a receiving node.

With the best-effort network such as the Internet, congestion causes packet loss.

Hereinafter, the packet loss caused by congestion over the network is described.

With the network communication, data divided into units called packets is transmitted via a packet switcher (hereinafter referred to as router) provided on the network.

The router has a limited buffer region for temporarily accumulating incoming packets. The following provides a step-by-step description of occurrence of congestion in the router.

FIG. 24 shows an example of occurrence of congestion in the router. Specifically, FIG. 24 is a schematic diagram showing a state in which no packets are accumulated in the buffer region.

In the case where the line speed of an output link which is output from a router 1701 is sufficiently fast and the router 1701 has a sufficient packet-switching capability, packets 1703 and 1704 are sent to the output link without a wait in the buffer region of the router. Here, the transmission delay of the packets 1703 and 1704 is approximately equal to a sum of the physical transmission delays on the network.

However, there are cases where the number of packets 1703 and 1704 entering the router 1701 increases, with the result that the number of the packets 1703 and 1704 goes beyond the line speed of the output link or the packet-switching capability of the router 1701. In such cases, the packets 1703 and 1704 start being accumulated in a buffer 1702 of the router 1701. Note that the buffer 1702 is the buffer region of the router 1701.

FIG. 25 shows another example of occurrence of congestion in the router. Specifically, FIG. 25 shows that packets have started to be accumulated in the buffer 1702.

With an increase in the number of packets 1803 and 1804 entering the router 1701, the packets 1803 and 1804 start to be accumulated in the buffer 1702 of the router 1701.

FIG. 26 shows yet another example of occurrence of congestion in the router. Specifically, FIG. 26 shows that the buffer 1702 is full with packets.

Packets 1903 and 1904 entering the router 1701 at this time overflow the buffer 1702 and end up being discarded. The discard of the packets 1903 and 1904 is known as a packet loss.

To address the packet loss, techniques such as retransmission control and forwarding error correction (FEC) are commonly used.

The retransmission control is to re-transmit the lost packets, thereby consuming at least a round trip time (RTT) of the packets between the transmitting node and the receiving node for packet loss detection and packet re-transmission. Consequently, the retransmission control technique often cannot be used in cases where real-time content distribution is required.

On the other hand, the FEC is a technique of generating, based on a degree of redundancy indicating a recovery capacity for data loss, redundant data for content data which is the original data, and transmitting the content data and the redundant data to the receiving node. Although the FEC consumes an additional network bandwidth compared to the retransmission control in order to transmit the redundant data, the necessary delay time is short. Thus, the FEC is suitable for cases where real-time content distribution is required.

However, although the FEC enables recovery of the original content data using the redundant data when a packet loss occurs, it cannot recover the lost content data when a packet loss occurs beyond the recovery capacity.

In the case of a loss of high-quality content data, noise and discontinuous image/sound are easily noticeable because the original content is high in quality, thereby possibly giving the viewer of the content a relatively greater feeling of discomfort. Conversely, an unnecessarily high redundancy results in an increase in the consumption of the network bandwidth caused by additional redundant data transmission, regardless of whether or not a packet loss occurs.

Here, since the available network bandwidth is limited, an increase in the network bandwidth consumed for the redundant data transmission leads to a decrease in the network bandwidth available for the content data transmission. A large amount of information is essentially needed when a content source such as video, audio, and music is to be coded in high quality. However, insufficiency in the information rate (hereinafter referred to as coding rate) available for coding the content source causes degradation in the content quality, such as noise breakout, which is undesirable.

In view of the above, it is necessary to recover the original content data and prevent unnecessary use of bandwidth for the additional redundant data transmission.

PTL 1 discloses a method of dynamically determining FEC redundancy which indicates a recovery capacity for data loss, based on a relatively long-term statistic such as a packet loss rate.

It is also possible to predict a packet loss using an index indicating network congestion, known as Explicit Congestion Notification (ECN).

PTL 2 discloses a method of predicting a packet loss using ECN feedback and a past packet loss pattern.

CITATION LIST

Patent Literature

[PT 1] Japanese Unexamined Patent Application Publication No. 2006-101275
[PTL 2] Japanese Unexamined Patent Application Publication No. 2002-124991

SUMMARY OF INVENTION

In the above prior art, however, with the FEC that dynamically determines the redundancy based on a relatively long-term statistic such as a packet loss rate, an unnecessarily low redundancy results in an insufficient recovery capacity for a sudden packet loss. Therefore, the prior art does not enable recovery of content data which has been lost.

FIG. 27 shows bandwidths consumed for the content data and the redundant data in the case of changing the FEC redundancy using a packet loss rate.

FIG. 27 shows change in bandwidth on the vertical axis and change in time on the horizontal axis. Here, it is assumed that a packet loss occurs at times T1 and T2. A sending rate 1300 is a bandwidth consumed for transmitting the content data and the redundant data. The sending rate 1300 is a constant value for simplicity.

Since no packet loss occurs in the period between times T0 and T1, the packet loss rate gradually decreases. As a result, the FEC redundancy determined using the packet loss rate decreases in a stepwise manner and the coding rate of the content data increases, which leads to a decrease in a bandwidth 1305 consumed for the redundant data transmission and an increase in a bandwidth 1304 consumed for the content data transmission.

The FEC redundancy is low when a packet loss occurs at the time T1, meaning an insufficiency in the capacity to recover from the packet loss, and it is unlikely that the lost content data can be recovered.

Next, immediately after the time T1, the FEC redundancy increases according to the temporarily-increased packet loss rate, and the coding rate of the content data decreases. This leads to an increase in the bandwidth 1305 consumed for the redundant data transmission and a decrease in the bandwidth 1304 consumed for the content data transmission.

In the period between the times T1 and T2, no packet loss occurs, and the packet loss rate gradually decreases as in the period between the times T0 and T1. As a result, the FEC redundancy determined using the packet loss rate decreases in a stepwise manner and the coding rate of the content data increases, which leads to a decrease in the bandwidth 1305 consumed for the redundant data transmission and an increase in the bandwidth 1304 consumed for the content data transmission.

As with the time T1, the FEC redundancy is low when a packet loss occurs at the time T2, meaning an insufficiency in the capacity to recover from the packet loss, and it is unlikely that the lost content data can be recovered.

As described above, it is not possible to effectively control the FEC redundancy with the prior art technique of determining the FEC redundancy using the packet loss rate, which is long-time statistical information.

Furthermore, with the method using the ECN feedback disclosed in PTL 2, although the ECN allows identification of network congestion, a time at which a packet loss occurs cannot be accurately predicted. Moreover, such a method requires a router compatible with the ECN. In addition, the loss prediction based on a past packet loss pattern cannot make a quick response to the constantly-changing network, and thus cannot accurately predict a packet loss or effectively control the FEC redundancy.

In view of the above drawbacks, it is an object of the present invention to provide a streaming communication device which accurately estimates a packet which will be lost in the future.

In order to achieve the above object, a streaming communication device according to an aspect of the present invention is a streaming communication device which transmits or receives a stream via a router over a packet-switched network, the streaming communication device including: an accumulating unit configured to accumulate a one-way delay that is a time period between transmission and reception of a packet which includes part of the stream; a detecting unit configured to detect a sign of a packet loss by identifying a tendency toward an increase in the one-way delay accumulated in the accumulating unit; and an estimating unit configured to estimate, when the sign is detected, a loss packet from a degree of the increase in the one-way delay accumulated in the accumulating unit, the loss packet being a packet which will be lost.

The packet loss occurs when a buffer of the router on the network is full. The one-way delay increases in proportion to the amount of packets in the buffer, and the one-way delay at the time of a packet loss is known in advance. Therefore, it is possible to accurately estimate when a packet loss will occur, that is, after how much time elapses after a current time, from the degree of the increase in the one-way delay and the known one-way delay at the time of a packet loss. It is therefore possible to estimate a packet which will be lost.

In addition, the streaming communication device may further include: a packet receiving unit configured to receive the packet; and an OWD calculating unit configured to calculate the one-way delay that is a difference between a reception time and a transmission time of the packet, the transmission time being included in the packet, and the accumulating unit may be configured to accumulate the one-way delay calculated by the OWD calculating unit.

In this manner, the one-way delay is calculated. This enables accurate estimation of a packet which will be lost.

In addition, the accumulating unit may be configured to further accumulate at least one of the transmission time and the reception time, and when the sign is detected, the estimating unit may be configured to estimate a packet loss time that is a time at which the packet loss will occur, the packet loss time being estimated from the following information which are accumulated in the accumulating unit: (i) the degree of the increase in the one-way delay; and (ii) at least one of the transmission time and the reception time.

In this manner, a time at which a packet loss will occur is accurately estimated. This enables accurate estimation, from the estimated time, of a packet which will be lost.

In addition, the accumulating unit may be configured to further accumulate a sequence number corresponding to the packet, and the estimating unit may be configured to estimate a loss packet sequence number that is a sequence number corresponding to a packet which will be lost, the loss packet sequence number being estimated from the following information which are accumulated in the accumulating unit: (i) the degree of the increase in the one-way delay; (ii) the sequence number; and (iii) at least one of the transmission time and the reception time.

In this manner, the loss packet sequence number, which is a sequence number corresponding to a packet which will be lost, is accurately estimated. This enables accurate estimation, from the estimated loss packet sequence number, of a packet which will be lost.

In addition, the streaming communication device may further include a control unit configured to control the estimated loss packet so as to recover, when the packet loss occurs, the part of the stream included in the packet which has been lost.

This enables recovery of the part of the stream included in the packet even in the event of a packet loss.

In addition, the accumulating unit may be configured to further accumulate at least one of a reception time and a transmission time of the packet, the transmission time being a time at which the packet has been transmitted, and when the sign is detected, the estimating unit may be configured to estimate a packet loss time that is a time at which the packet loss will occur, the packet loss time being estimated from the following information which are accumulated in the accumulating unit: (i) the degree of the increase in the one-way delay; and (ii) at least one of the transmission time and the reception time.

This enables accurate estimation of a packet which will be lost. Thus, the part of the stream included in the packet can be recovered even if a packet loss occurs at the estimated packet loss time.

In addition, the control unit may be configured to increase a proportion of redundant data included in a packet which is to be transmitted either at the estimated packet loss time or in a predetermined time period including the estimated packet loss time, so that the proportion of the redundant data is greater than a proportion of redundant data included in a packet which is to be transmitted either at a time other than the estimated packet loss time or at a time not included in the predetermined time period including the estimated packet loss time.

This increases the proportion of the redundant data in the packet which is to be transmitted either at the time when a packet loss will occur or in the predetermined time period including the time when a packet loss will occur. Therefore, the part of the stream included in the packet can be recovered even if a packet loss occurs.

In addition, the control unit may be configured to perform control to cause transmission of (i) a packet which is to be transmitted either at the estimated packet loss time or in a predetermined time period including the estimated packet loss time, and (ii) a duplicate of the packet.

This enables transmission of (i) the packet to be transmitted either at the time when a packet loss will occur or in the predetermined time period including the time when a packet loss will occur, and (ii) a duplicate of such a packet. Thus, even if a packet loss occurs, the transmitted duplicate of the packet allows recovery of the part of the stream included in the packet.

In addition, when the one-way delay increases at a predetermined rate, the estimating unit may be configured to estimate the packet loss time by adding, to either the transmission time or the reception time, a time it takes for the one-way delay to reach a one-way delay in a previous packet loss, and the predetermined rate may be a rate of the increase in the one-way delay accumulated in the accumulating unit.

This enables estimation of the packet loss time. It is therefore possible to accurately estimate a packet which will be lost.

In addition, the accumulating unit may be configured to further accumulate a sequence number corresponding to the packet, and when the sign is detected, the estimating unit may be configured to estimate a loss packet sequence number that is a sequence number corresponding to a packet which will be lost, the loss packet sequence number being estimated from the following information which are accumulated in the accumulating unit: (i) the sequence number; (ii) the degree of the increase in the one-way delay; and (iii) at least one of a transmission time and a reception time.

This enables accurate estimation of a loss packet sequence number that is a sequence number corresponding to a packet which will be lost. Therefore, even if a packet loss corresponding to the estimated loss packet sequence number occurs, it is possible to recover the part of the stream included in the packet.

In addition, the control unit may be configured to increase a proportion of redundant data included in the packet corresponding to the estimated loss packet sequence number, so that the proportion of the redundant data is greater than a proportion of redundant data included in a packet corresponding to a sequence number other than the estimated loss packet sequence number.

This increases the proportion of the redundant data included in the packet corresponding to the estimated loss packet sequence number. Therefore, the part of the stream included in the packet can be recovered even if a packet loss occurs.

In addition, the control unit may be configured to perform control to cause transmission of (i) the packet corresponding to the estimated loss packet sequence number and (ii) a duplicate of the packet.

This enables transmission of (i) the packet corresponding to the estimated loss packet sequence number and (ii) a duplicate of such a packet. Thus, even if a packet loss occurs, the transmitted duplicate of the packet allows recovery of the part of the stream included in the packet.

In addition, the detecting unit may be configured to detect the sign when the number of periods in which the one-way delay continuously increases is equal to or greater than a predetermined first threshold.

This enables detection of a sign of a packet loss. It is therefore possible to accurately estimate a packet which will be lost.

In addition, the detecting unit may be configured to change the first threshold according to a value of a parameter related to the packet.

This enables accurate detection of a sign of a packet loss. It is therefore possible to accurately estimate a packet which will be lost.

In addition, the detecting unit may be configured to increase the first threshold as a reception interval decreases, the reception interval being an interval at which the packet is received.

This enables detection of a sign of a packet loss with higher accuracy. It is therefore possible to more accurately estimate a packet which will be lost.

In addition, the detecting unit may be configured to determine whether or not an average of amounts of increase in the one-way delay in a predetermined time period is equal to or greater than a predetermined second threshold, and to detect the sign when determining that the average of the amounts of increase is equal to or greater than the second threshold.

This enables accurate detection of a sign of a packet loss. It is therefore possible to accurately estimate a packet which will be lost.

In addition, the streaming communication device may transmit or receive the stream via a plurality of routers, and the estimating unit may be configured to estimate the loss packet based on a one-way delay in a past packet loss that occurred in a router included in the plurality of routers.

This enables estimation, for each router, of a packet which will be lost, from a degree of increase in the one-way delay that is a time period between transmission and reception of a packet.

Note that the present invention can be realized not only as the above streaming communication device, but also as a streaming communication method which includes, as steps, the characteristic elements included in the streaming communication device.

In addition, the present invention may be realized as a streaming communication system. A streaming communication system according to an aspect of the present invention is a streaming communication system including: a first streaming communication device which receives a stream via a router over a packet-switched network; and a second streaming communication device which transmits the stream via the router over the packet-switched network, the first streaming communication device including: an OWD calculating unit configured to calculate a one-way delay that is a difference between a reception time and a transmission time of a packet, the transmission time being a time at which the packet has been transmitted; an accumulating unit configured to accumulate the one-way delay; a detecting unit configured to detect a sign of a packet loss by identifying a tendency toward an increase in the one-way delay accumulated in the accumulating unit; and an estimating unit configured to estimate, when the sign is detected, a loss packet from a degree of the increase in the one-way delay accumulated in the accumulating unit, the loss packet being a packet which will be lost, and the second streaming communication device including a control unit configured to control the estimated loss packet so as to recover, when the packet loss occurs, part of the stream included in the packet which has been lost.

In addition, the present invention may be realized as another streaming communication system. A streaming communication system according to another aspect of the present invention is a streaming communication system including: a first streaming communication device which receives a stream via a router over a packet-switched network; and a second streaming communication device which transmits the stream via the router over the packet-switched network, the first streaming communication device including an OWD calculating unit configured to calculate a one-way delay that is a difference between a reception time and a transmission time of a packet, the transmission time being a time at which the packet has been transmitted, and the second streaming communication device including: an accumulating unit configured to accumulate the one-way delay; a detecting unit configured to detect a sign of a packet loss by identifying a tendency toward an increase in the one-way delay accumulated in the accumulating unit; an estimating unit configured to estimate, when the sign is detected, a loss packet from a degree of the increase in the one-way delay accumulated in the accumulating unit, the loss packet being a packet which will be lost; and a control, unit configured to control the estimated loss packet so as to recover, when the packet loss occurs, part of the stream included in the packet which has been lost.

With the above features, the present invention provides a streaming communication device, a streaming communication method, and a streaming communication system for accurately estimating a packet which will be lost in the future.

BRIEF DESCRIPTION OF DRAWINGS

FIG. 11 shows OWDs held by an estimating unit of a streaming communication device according to Embodiment 1, each being an OWD at the time of a packet loss that has occurred in a corresponding one of routers.

DESCRIPTION OF THE INVENTION

Embodiment 1

The streaming communication device according to Embodiment 1 is a streaming communication device which transmits or receives a stream via a router over a network. The streaming communication device accumulates a one-way delay of a packet and identifies a tendency toward an increase in the value of the one-way delay. By doing so, the streaming communication device according to Embodiment 1 detects a sign of a packet loss. Upon detecting the sign of a packet loss, the streaming communication device estimates a packet loss time at which a packet loss will occur, from a degree of increase (extension) in the value of the one-way delay. Here, it is desirable that the streaming communication device controls a packet to be transmitted, so as to prevent occurrence of a packet loss at the estimated time. Such control includes increasing the redundancy of the redundant data included in the packet to be transmitted.

Hereinafter, a detailed description is provided with reference to the drawings.

Figure 1:
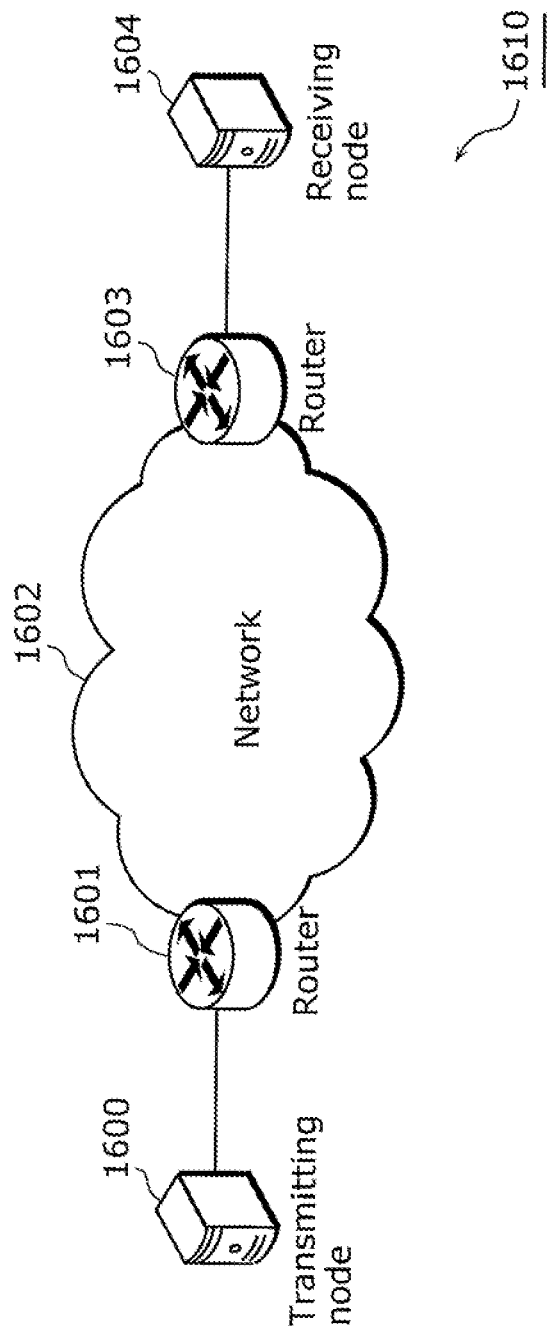
FIG. 1 shows a system configuration of a streaming communication system according to Embodiment 1.

FIG. 1 shows a system configuration of a streaming communication system 1610 according to Embodiment 1.

The streaming communication system 1610 includes a streaming communication device 1600 which distributes a stream (hereinafter referred to as a transmitting node), routers 1601 and 1603, and a streaming communication device 1604 which receives the stream (hereinafter referred to as a receiving node).

The transmitting node 1600, the routers 1601 and 1603, and the receiving node 1604 are connected via a network 1602.

The transmitting node 1600 converts content, such as video, into content data which is in units of packets, and distributes the content data to the receiving node 1604 as a stream. The transmitting node 1600 is a computer, for example.

The routers 1601 and 1603 are packet switchers provided on the network, and read addresses added to incoming packets and transfer the packets to corresponding paths. The routers 1601 and 1603 include a buffer for temporarily storing the packets.

The network 1602 is a packet-switched network via which one or more routers, switches, or host computers are mutually connected.

The receiving node 1604 receives and decodes the content data distributed by the transmitting node 1600, and outputs the resultant content. For example, the receiving node 1604 is a personal computer.

In many cases, there is no synchronization between the clock used for managing time in the transmitting node 1600 and the clock used for managing time in the receiving node 1604.

Hereinafter, structures of the receiving node 1604 and the transmitting node 1600 according to Embodiment 1 are described.

Figure 2:
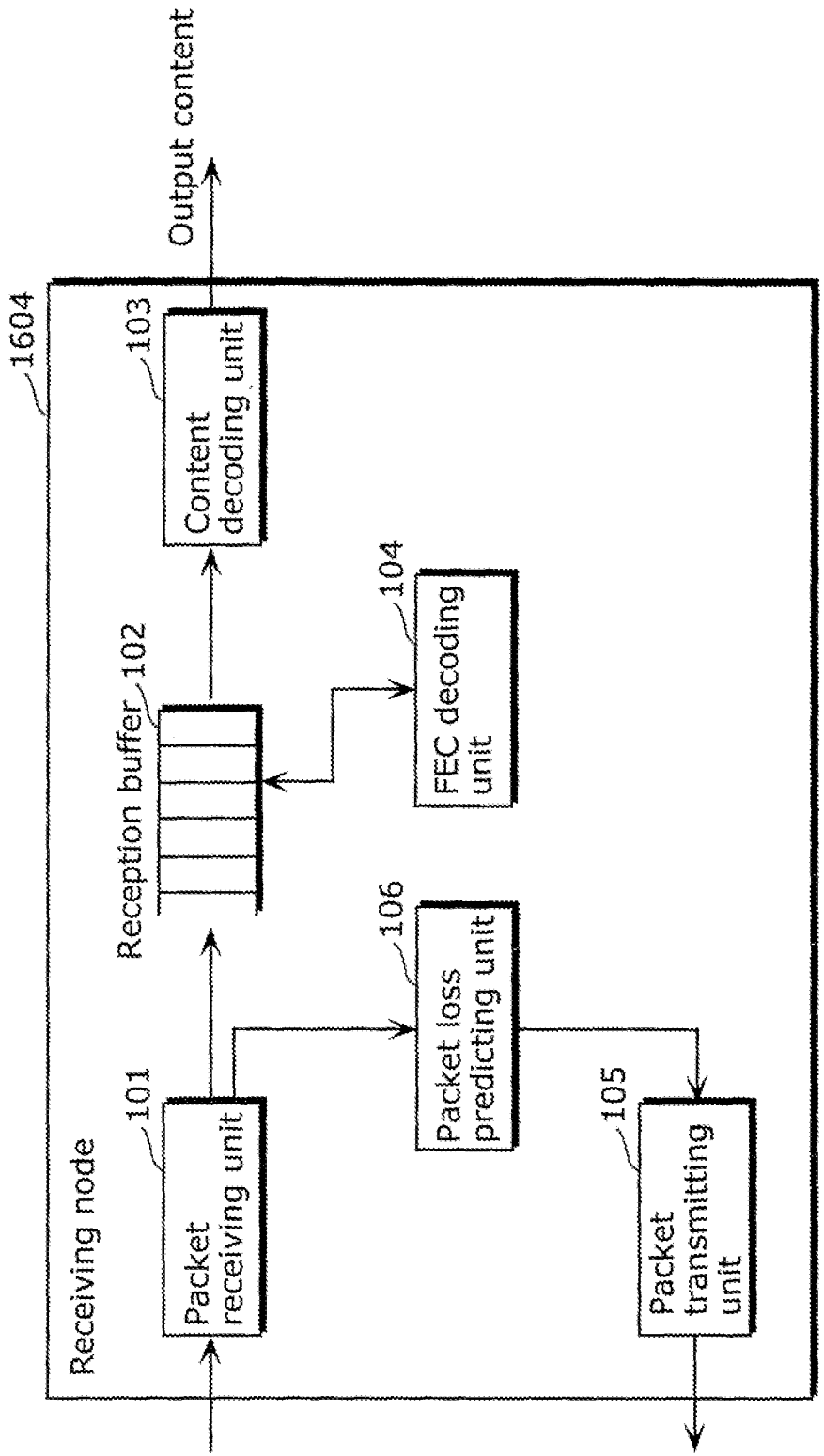
FIG. 2 is a block diagram showing a structure of a receiving node which is a streaming communication device according to Embodiment 1.

FIG. 2 is a block diagram showing a structure of the receiving node 1604 according to Embodiment 1.

The receiving node 1604 receives and decodes a packet including the content data transmitted by the transmitting node 1600, and outputs the resultant content. Furthermore, the receiving node 1604 predicts a time at which a packet loss will occur, and transmits to the transmitting node an estimated packet loss time that is the time at which a packet loss is predicted to occur. The receiving node 1604 includes a packet receiving unit 101, a reception buffer 102, a content decoding unit 103, an FEC decoding unit 104, a packet transmitting unit 105, and a packet loss predicting unit 106.

The packet receiving unit 101 receives, at any time intervals, packets transmitted from the transmitting node via the network. For example, the packet receiving unit 101 is a LAN I/F card.

The reception buffer 102 temporarily accumulates a packet is received from the packet receiving unit 101. Here, the received packet includes content data or redundant data, or both. For example, the reception buffer 102 is a semiconductor memory.

The content decoding unit 103 extracts coded content data from the packet accumulated in the reception buffer 102, and decodes the coded content data. Furthermore, the content decoding unit 103 outputs the content with any timing. For example, the content decoding unit 103 is a CPU.

When a packet loss occurs on the received packet, the FEC decoding unit 104 recovers with any timing the lost content data using the redundant data included in the packet accumulated in the reception buffer 102. For example, the FEC decoding unit 104 is a CPU. The FEC decoding unit 104 does not perform the lost packet recovery process when no packet loss occurs.

The packet transmitting unit 105 transmits a packet including a report created by the packet loss predicting unit 106, to the transmitting node via the network. The report includes the estimated packet loss time. For example, the packet transmitting unit 105 is a LAN I/F card.

The packet loss predicting unit 106 estimates a packet loss time using the packet which has been received via the packet receiving unit 101 and includes a transmission time. For example, the packet loss predicting unit 106 is a CPU including a memory.

Figure 3:
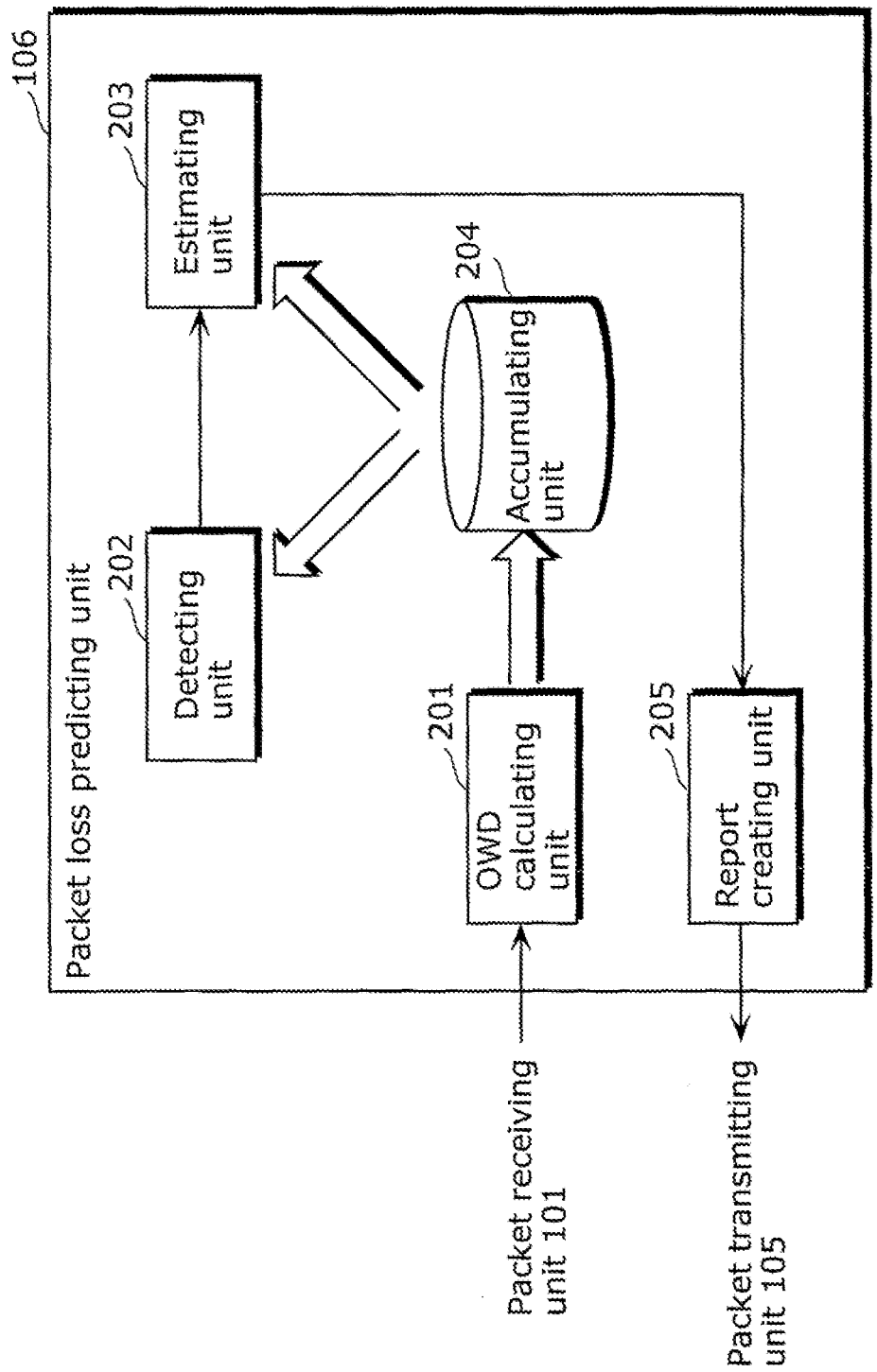
FIG. 3 is a block diagram showing a detailed structure of a packet loss predicting unit of a streaming communication device according to Embodiment 1.

FIG. 3 is a block diagram showing an example of a detailed structure of the packet loss predicting unit 106.

The packet loss predicting unit 106 includes an OWD calculating unit 201, a detecting unit 202, an estimating unit 203, an accumulating unit 204, and a report creating unit 205.

The OWD calculating unit 201 calculates a time period between a transmission of a packet and a reception of the packet, based on the transmission time added to the packet and a reception time at which the receiving node 1604 receives the packet. In other words, the OWD calculating unit 201 calculates a one-way delay (hereinafter referred to as OWD) and stores the OWD in the accumulating unit 204 as an OWD history.

Note that the transmission time is a time based on the clock managed by the transmitting node 1600, and the reception time is a time based on the clock managed by the receiving node 1604. As previously mentioned, it should be noted that there is no synchronization between the clock of the transmitting node 1600 and the clock of the receiving node 1604.

Hereinafter, a relationship between the packet loss and the OWD is described.

Figure 4:
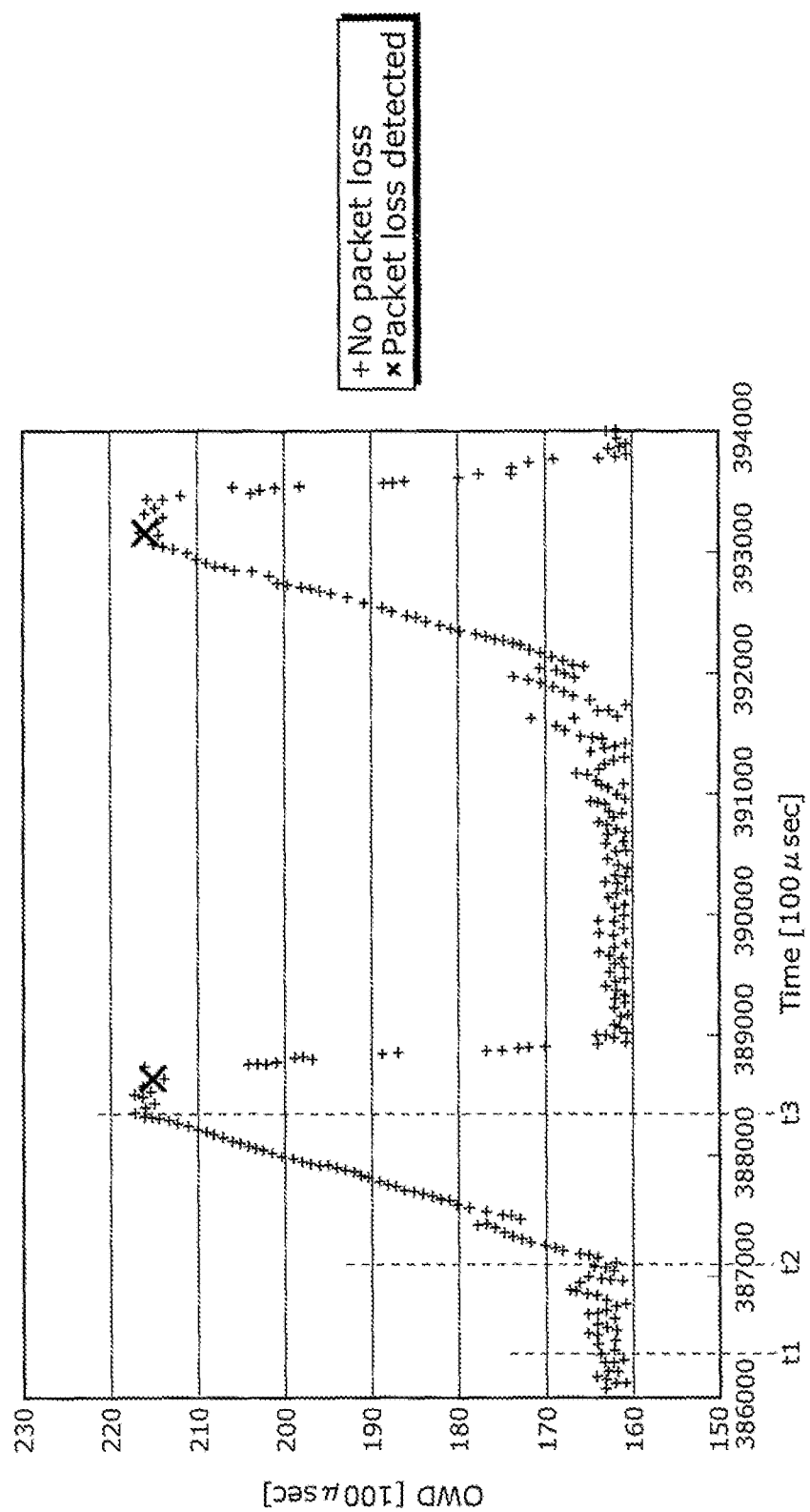
FIG. 4 is a graph showing a relationship between lapse of time and OWD in the case where congestion occurs in one router.

FIG. 4 is a graph showing a relationship between lapse of time and the OWD in the case where congestion occurs in one router. In FIG. 4, the horizontal axis represents time and the vertical axis represents OWD.

When there is almost no packet in the buffer of the router, the OWD depends on the length, type, and speed of the transmission path between the transmitting node and the receiving node. The OWD at this time is stable as shown between t1 to t2 in FIG. 4.

Next, when packets start being accumulated in the buffer of the router, the OWD increases by a time period from when a packet is stored in the buffer of the router to when the packet is taken out therefrom. It means that the OWD increases in proportion to the amount of packets accumulated in the buffer of the router (t2 to t3).

Then, once the buffer of the router becomes full with the packets, the OWD no longer increases. A packet which is to enter the buffer of the router in this state is discarded, resulting in occurrence of a packet loss at the times indicated by a cross in FIG. 4.

In view of the above, a sign of a packet loss can be detected from the OWD increase.

The accumulating unit 204 holds, as the OWD history, the OWD calculated by the OWD calculating unit 201. The OWD history indicates the OWD of each packet received. For example, the accumulating unit 204 is a memory.

The accumulating unit 204 also holds, as a time history, a transmission time added to a packet received, as well as holding, as the OWD history, the OWD calculated by the OWD calculating unit 201. Note that as the time history, the accumulating unit 204 may hold a reception time at which a packet has been received, or hold both the transmission time added to the packet and the reception time at which the packet has been received.

The detecting unit 202 determines based on the OWD history held by the accumulating unit 204 whether or not there is a sign of a packet loss. The sign of a packet loss is a tendency toward an increase in the OWD in a predetermined period of the OWD history.

When the detecting unit 202 detects the sign of a packet loss, the estimating unit 203 estimates a packet loss time based on the OWD history, the time history, and the OWD immediately before or after a previous packet loss, which are held by the accumulating unit 204.

The estimating unit 203 calculates the packet loss time using a least square method, for example. At the time of detecting the sign of a packet loss, the packet loss time, denoted by X, can be calculated according to Equation 1 below, assuming that: yi is an OWD measured value in a period indicating a tendency toward a continuous increase in the OWD; xi is a transmission time of a received packet in the same period; and Y is an average of OWD measured values immediately after a previous packet loss, where $1 \le i \le n$.

[Math. 1]

$$X = \frac{Y - \alpha}{\beta} \quad \text{(Equation 1)}$$

$$\alpha = \frac{\sum_{i=1}^{n} x_i^2 \sum_{i=1}^{n} y_i - \sum_{i=1}^{n} x_i y_i \sum_{i=1}^{n} x_i}{n \sum_{i=1}^{n} x_i^2 - \left(\sum_{i=1}^{n} x_i\right)^2}$$

$$\beta = \frac{n \sum_{i=1}^{n} x_i y_i - \sum_{i=1}^{n} x_i \sum_{i=1}^{n} y_i}{n \sum_{i=1}^{n} x_i^2 - \left(\sum_{i=1}^{n} x_i\right)^2}$$

The report creating unit 205 creates a report indicating the estimated packet loss time.

In such a manner, the receiving node 1604 of Embodiment 1 calculates and accumulates the OWDs, and accurately estimates, from the accumulated OWDs, the time at which a packet loss will occur.

Next, a structure of the transmitting node 1600 is described.

Figure 5:
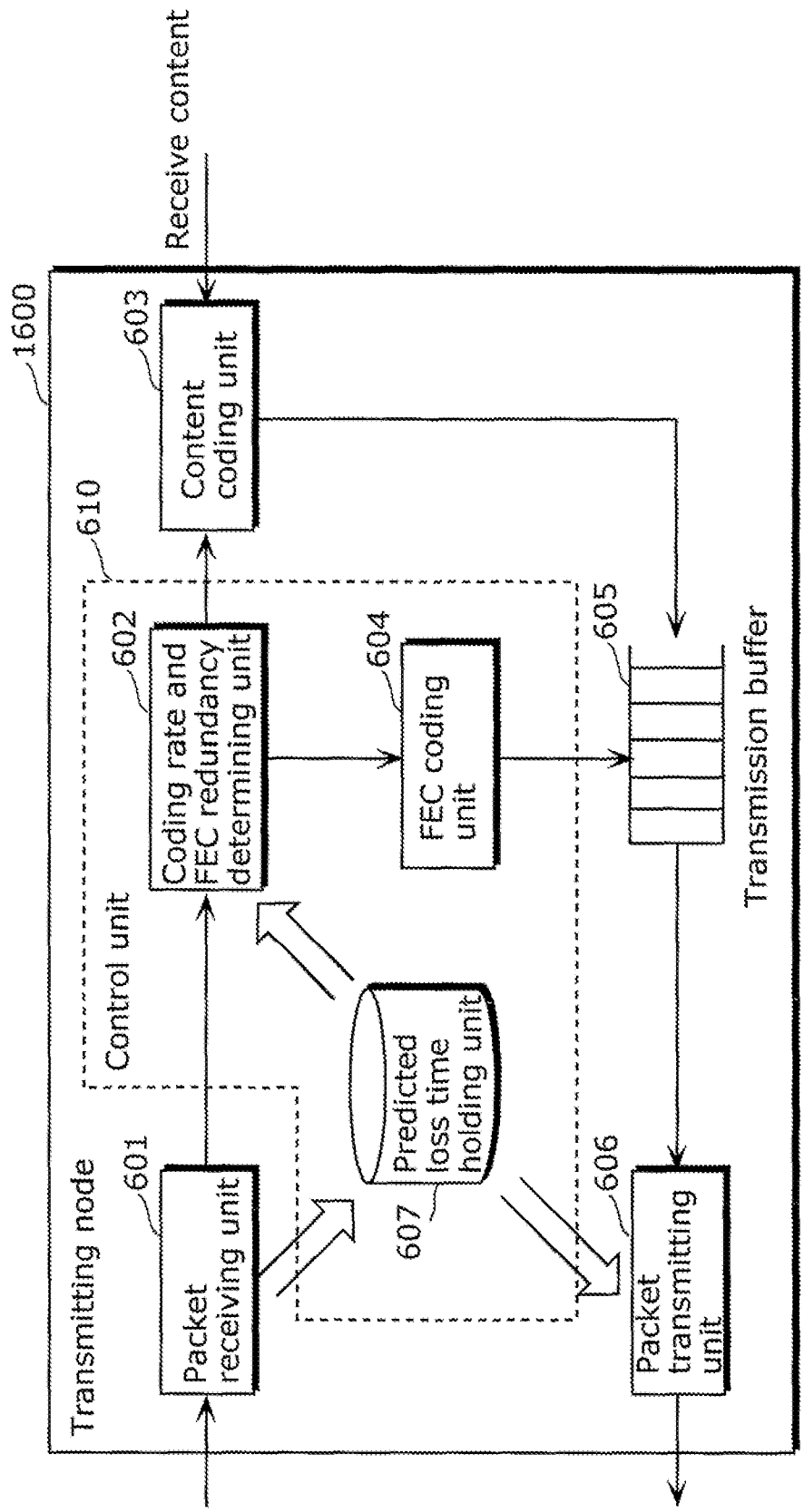
FIG. 5 is a block diagram showing a structure of a transmitting node which is a streaming communication device according to Embodiment 1.

FIG. 5 is a block diagram showing a structure of the transmitting node 1600 according to Embodiment 1.

The transmitting node 1600 includes a packet receiving unit 601, a coding rate and FEC redundancy determining unit 602, a content coding unit 603, an FEC coding unit 604, a transmission buffer 605, a packet transmitting unit 606, and a predicted loss time holding unit 607.

Here, the coding rate and FEC redundancy determining unit 602, the FEC coding unit 604, and the predicted loss time holding unit 607 function as a control unit 610.

The packet receiving unit 601 receives, via the network 1602, a packet including a report created by the receiving node 1604. Here, the report includes the estimated packet loss time. For example, the packet receiving unit 601 is a LAN I/F card. The packet receiving unit 601 writes the estimated packet loss time into the predicted loss time holding unit 607.

The coding rate and FEC redundancy determining unit 602 determines a coding rate of content and FEC redundancy based on the estimated packet loss time recorded in the predicted loss time holding unit 607. For example, the coding rate and FEC redundancy determining unit 602 is a CPU. The FEC redundancy refers to a proportion of redundant data included in a packet. The greater the FEC redundancy of a packet, the higher the capacity to recover content data when a packet loss occurs.

More specifically, the coding rate and FEC redundancy determining unit 602 increases the FEC redundancy for content data which is to be transmitted at the estimated packet loss time. Note that the coding rate and FEC redundancy determining unit 602 may perform control to decrease the FEC redundancy for content data which is to be transmitted at a time other than the estimated packet loss time.

The content coding unit 603 codes a content source according to the coding rate determined by the coding rate and FEC redundancy determining unit 602, and stores the coded content data in the transmission buffer 605. For example, the content coding unit 603 is a CPU.

The FEC coding unit 604 generates redundant data for content data according to the FEC redundancy determined by the coding rate and FEC redundancy determining unit 602, and stores the redundant data in the transmission buffer 605. For example, the FEC coding unit 604 is a CPU.

The transmission buffer 605 temporarily accumulates packetized content data and redundant data. Note that the packet may be a real-time transport protocol (RTP) packet. For example, the transmission buffer 605 is a memory.

The packet transmitting unit 606 transmits the packet stored in the transmission buffer 605 to the receiving node 1604 at any rate via the network 1602. Furthermore, when transmitting the packet, the packet transmitting unit 606 adds a transmission time to the packet. For example, the packet transmitting unit 606 is a LAN I/F card.

The predicted loss time holding unit 607 holds the packet loss time estimated by the receiving node. For example, the predicted loss time holding unit 607 is a memory.

In such a manner, the transmitting node 1600 of Embodiment 1 controls the FEC redundancy based on the packet loss time estimated by the receiving node 1604. This enables the receiving node 1604 to recover, when a packet loss occurs at the estimated packet loss time, the content data included in the packet which has been lost.

Next, processing flows of the receiving node 1604 and the transmitting node 1600 according to Embodiment 1 are described.

Figure 6:
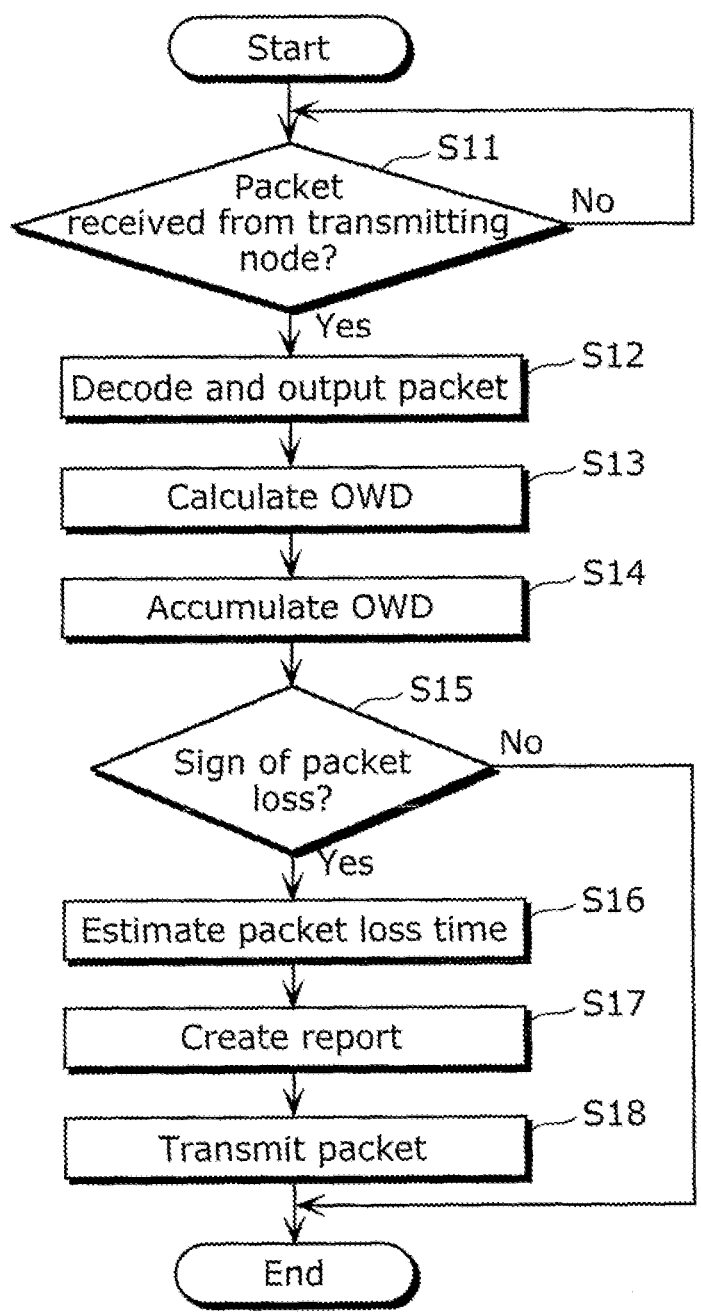
FIG. 6 is a flowchart showing a processing flow of a receiving node which is a streaming communication device according to Embodiment 1.

FIG. 6 is a flowchart showing a processing flow of the receiving node 1604 according to Embodiment 1.

The packet receiving unit 101 monitors whether or not a packet is received from the transmitting node 1600 (S11). In the case where no packet is received (No in S11), the packet receiving unit 101 continues to monitor whether or not a packet is received from the transmitting node 1600.

In the case where a packet is received (Yes in S11), the packet receiving unit 101 stores the packet in the reception buffer 102. The FEC decoding unit 104 recovers lost content data using the redundant data of the packet stored in the reception buffer 102. The FEC decoding unit 104 does not perform the recovery process when no packet loss has occurred on the packet-switched network.

The content decoding unit 103 extracts and decodes the recovered packet content data, and outputs the resultant content (S12).

Furthermore, the packet receiving unit 101 outputs the received packet to the OWD calculating unit 201.

The OWD calculating unit 201 calculates an OWD based on (i) a transmission time which is added to the packet and indicates the time at which the packet has been transmitted from the transmitting node 1600 and (ii) a reception time at which the packet has been received (S13).

The accumulating unit 204 accumulates the calculated OWD (S14).

The detecting unit 202 determines based on the OWD history accumulated in the accumulating unit 204 whether or not there is a sign of a packet loss (S15).

In the case where the detecting unit 202 determines that there is a sign of a packet loss (Yes in S15), the estimating unit 203 estimates a packet loss time (S16). The report creating unit 205 creates a report indicating the estimated packet loss time (S17).

The packet transmitting unit 105 transmits a packet including the report to the transmitting node 1600 (S18).

On the other hand, the packet transmitting unit 105 does not transmit anything when there is no sign of a packet loss (No in S15).

Figure 7A:
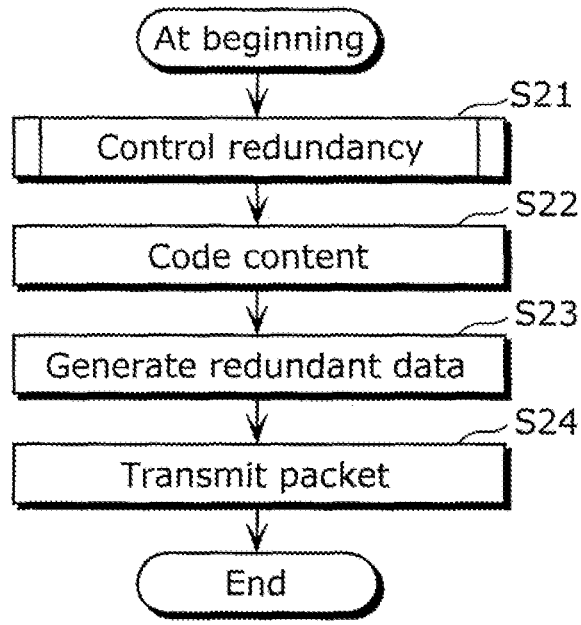
FIG. 7A is a flowchart showing an example of a processing flow of a transmitting node which is a streaming communication device according to Embodiment 1.
Figure 7B:
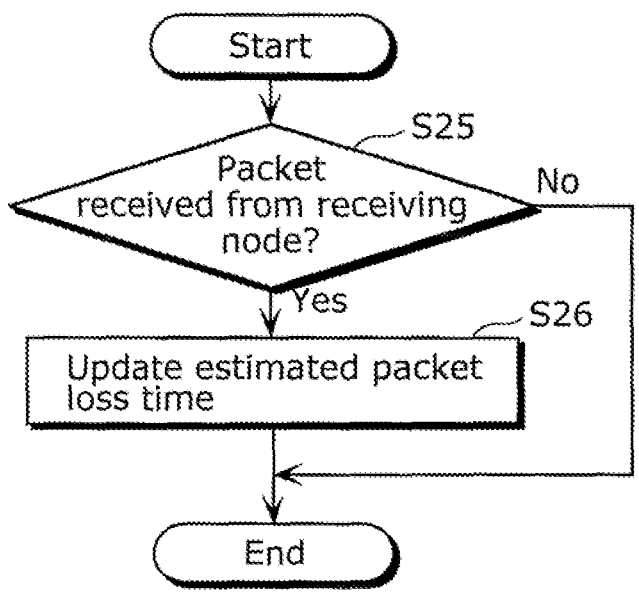
FIG. 7B is a flowchart showing another example of a processing flow of a transmitting node which is a streaming communication device according to Embodiment 1.

FIGS. 7A and 7B are flowcharts each showing a processing flow of the transmitting node 1600 according to Embodiment 1.

FIG. 7A is a flowchart showing a processing flow of processing units included in the transmitting node 1600 except the packet receiving unit 601 and the predicted loss time holding unit 607.

Based on the estimated packet loss time indicated in the report received from the receiving node 1604, the coding rate and FEC redundancy determining unit 602 controls the coding rate and the FEC redundancy for content to be transmitted (S21). A specific description of the FEC redundancy control is provided later.

In the case of receiving a content signal, the content coding unit 603 codes the content according to the coding rate determined by the coding rate and FEC redundancy determining unit 602, so as to generate a packet including the content data. After that, the content coding unit 603 stores the packet in the transmission buffer 605 (S22).

Next, the FEC coding unit 604 generates redundant data according to the FEC redundancy determined by the coding rate and FEC redundancy determining unit 602, and stores the redundant data in the transmission buffer (S23).

The packet transmitting unit 606 transmits the packet stored in the transmission buffer 605 to the receiving node 1604 (S24).

FIG. 7B is a flowchart showing a processing flow of the packet receiving unit 601 and the predicted loss time holding unit 607.

The packet receiving unit 601 determines whether or not a packet is received from the receiving node 1604 (S25). In the case where a packet is received (Yes in S25), the packet receiving unit 601 updates the estimated packet loss time stored in the predicted loss time holding unit 607 (S26). In the case where no packet is received (No in S25), the packet receiving unit 601 does not perform anything but ends the processing.

Next is a description of a detailed processing flow of the redundancy control (S21) included in the flowchart of the transmitting node 1600.

Figure 8:
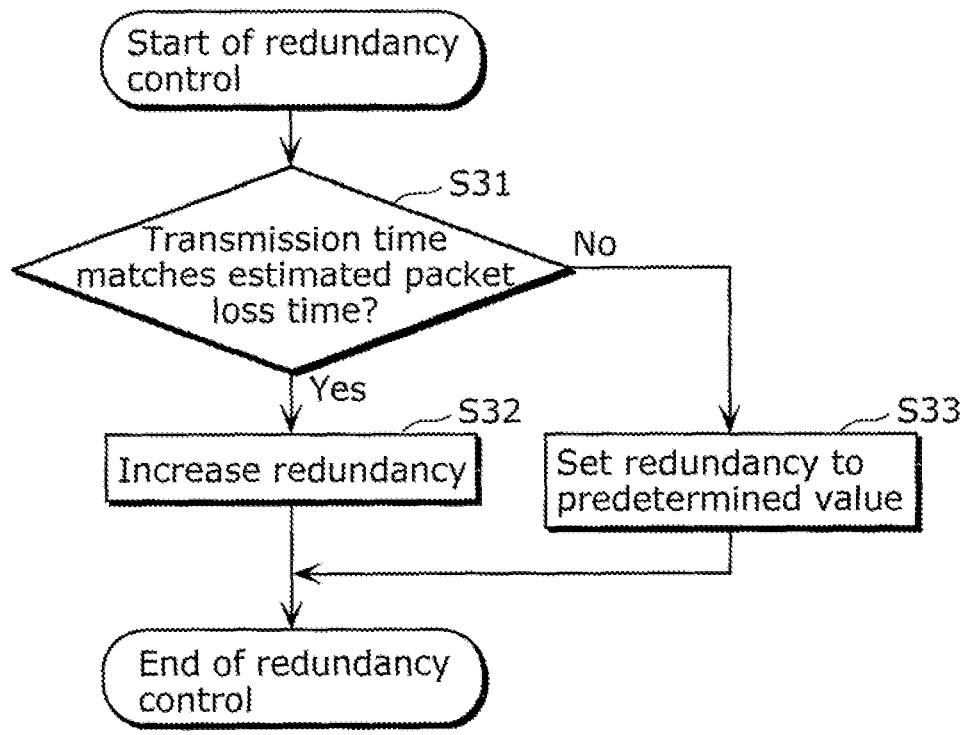
FIG. 8 is a flowchart showing a specific example of a processing flow of redundancy control performed by a streaming communication device according to Embodiment 1.

FIG. 8 is a flowchart showing a specific example of a processing flow of the redundancy control.

The coding rate and FEC redundancy determining unit 602 determines whether or not the transmission time of the content data matches the estimated packet loss time (S31).

In the case where the transmission time matches the estimated packet loss time (Yes in S31), the coding rate and FEC redundancy determining unit 602 increases the FEC redundancy for content data which is to be transmitted at the estimated packet loss time (S32). Note that the coding rate and FEC redundancy determining unit 602 may perform control to decrease the FEC redundancy for content data which is to be transmitted at a time other than the estimated packet loss time.

In the case where the transmission time does not match the estimated packet loss time (No in S31), the coding rate and FEC redundancy determining unit 602 sets the FEC redundancy to a predetermined value for content data which is to be transmitted at the transmission time (S33).

In such a manner, the streaming communication device of Embodiment 1 detects a sign of a packet loss by identifying a tendency toward an increase in the OWD, thereby being capable of accurately estimating, from the degree of the increase in the OWD (a rate of change in the OWD), the packet loss time at which a packet loss will occur.

Furthermore, the streaming communication device increases the FEC redundancy of a packet which is to be transmitted at the estimated packet loss time, so as to prevent occurrence of a packet loss at the estimated packet loss time.

Figure 9:
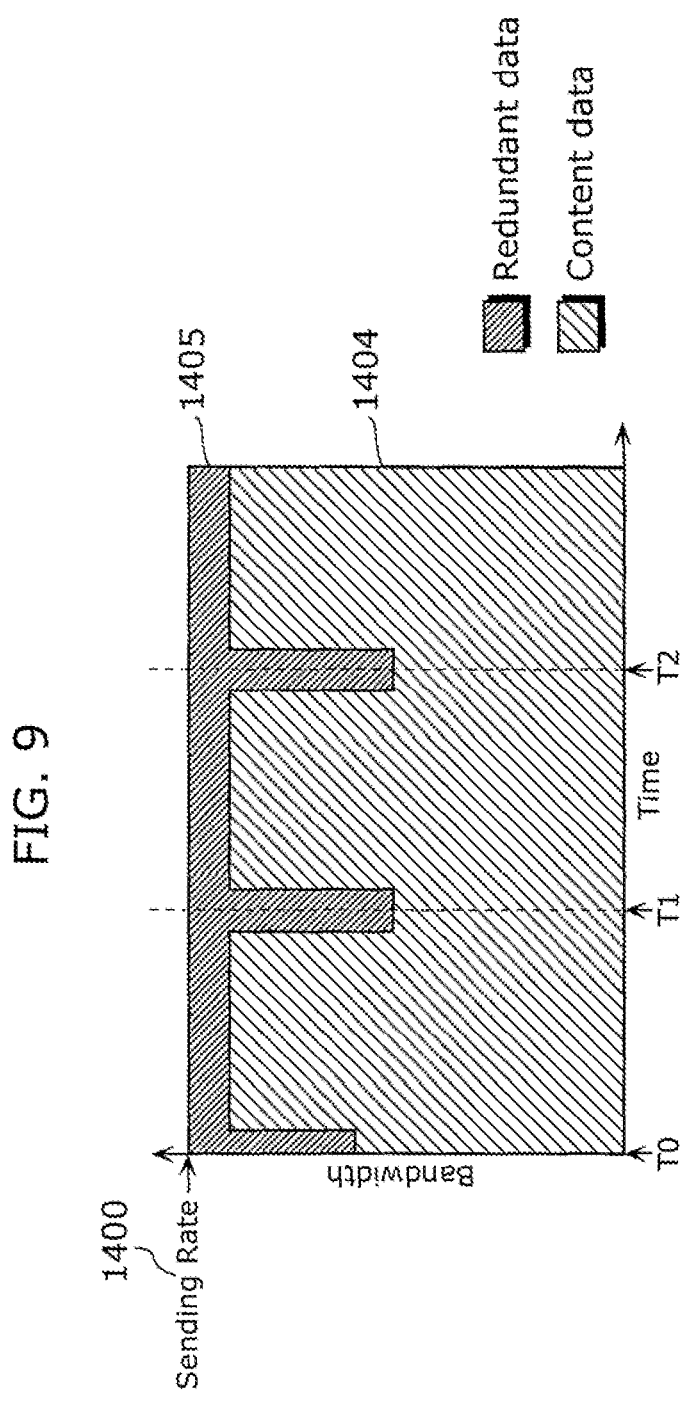
FIG. 9 shows redundant data included in a packet transmitted by a streaming communication device according to Embodiment 1.

FIG. 9 shows a bandwidth 1404 consumed for the content data transmission performed by the transmitting node 1600 which is a streaming communication device in Embodiment 1, and a bandwidth 1405 consumed for the redundant data transmission performed by the same.

Figure 27:
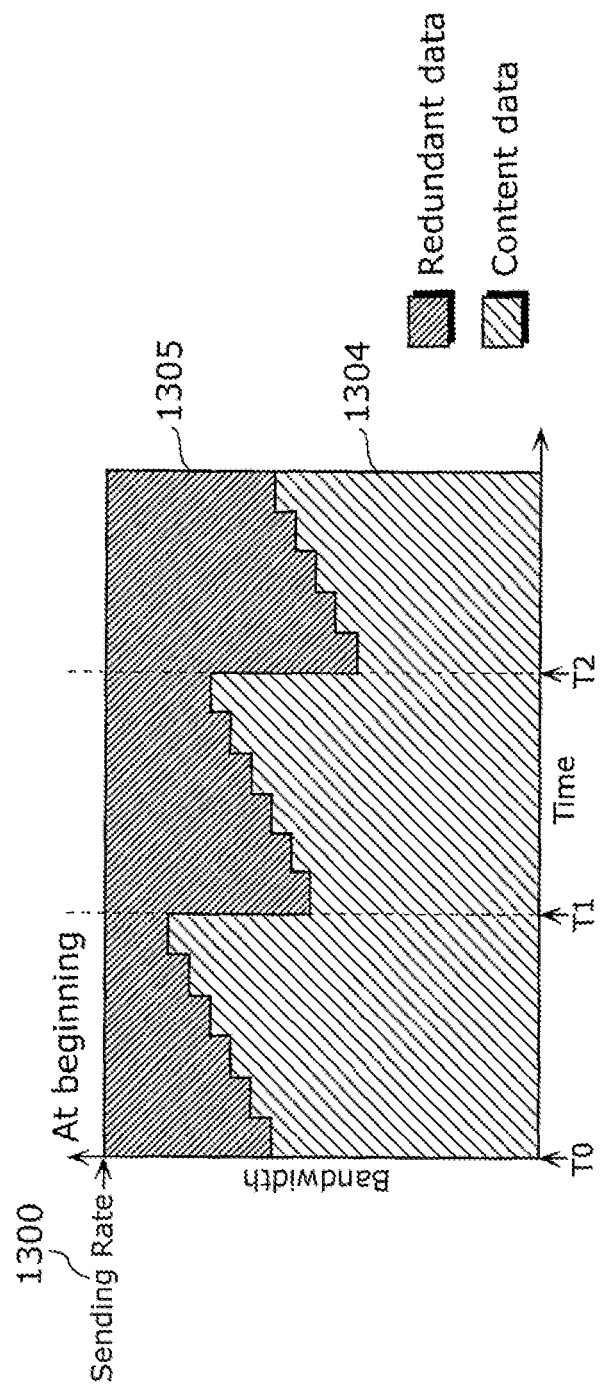
FIG. 27 shows redundant data included in a packet transmitted by a conventional streaming communication device.

As in FIG. 27, FIG. 9 shows change in bandwidth on the vertical axis and change in time on the horizontal axis. Here, it is assumed that a packet loss occurs at times T1 and T2. A sending rate 1400 is a bandwidth consumed for transmitting the content data and the redundant data. The sending rate 1400 is a constant value for simplicity.

According to Embodiment 1, there is no sign of a packet loss in the period between times T0 and T1, and thus the FEC redundancy is decreased and the coding rate of the content data is increased in the period between the times T0 and T1. This causes a change in the consumed bandwidth; a decrease in the bandwidth 1405 consumed for the redundant data transmission, and an increase in the bandwidth 1404 consumed for the content data transmission.

In view of the above, since a wider bandwidth can be allocated to the content data, a coding rate sufficient for maintaining the content quality can be ensured, thereby preventing degradation of the content quality.

Next, when the time approaches the time T1, the receiving node 1604 detects a sign of a packet loss. Then, the receiving node 1604 predicts a time at which a packet loss is likely to occur, and increases the FEC redundancy and decreases the coding rate of the content data near the time T1. This leads to a change in the consumed bandwidth; an increase in the bandwidth 1405 consumed for the redundant data transmission, and a decrease in the bandwidth 1404 consumed for the content data transmission.

Here, since the FEC redundancy is increased near the time T1 at which a packet loss will occur, the capacity to recover from the packet loss can be sufficiently ensured. Therefore, even in the event of a packet loss, it is highly possible that lost content data can be recovered.

Likewise, the streaming communication device of Embodiment 1 increases the FEC redundancy and decreases the coding rate of the content data near the time T2 at which a next packet loss will occur, just as near the time T1. This leads to a change in the consumed bandwidth; an increase in the bandwidth 1405 consumed for the redundant data transmission, and a decrease in the bandwidth 1404 consumed for the content data transmission.

Here, since the FEC redundancy is increased near the time T2 at which a packet loss will occur, the capacity to recover from the packet loss can be sufficiently ensured. Therefore, it is highly possible that lost content data can be recovered.

In such a manner, the streaming communication device of Embodiment 1 of the present invention increases the FEC redundancy for a time point at which a packet loss is likely to occur. This prevents a loss of content data caused by a packet loss.

Furthermore, as for a time point at which a packet loss is less likely to occur, a wider portion of the available network bandwidth is allocated to the content data so as to increase the coding rate, thereby enhancing the quality of the distributed content. In addition, the streaming communication device of Embodiment 1 can prevent distortion and noise in the content caused by an insufficient coding rate. The advantageous effect brought about by the prevention of the distortion and noise is more remarkable in the case of distributing, over the network, high-quality content in which noise and discontinuous image/sound resulting from a loss of content data are easily noticeable.

Note that the packet transmitting unit 105 may transmit, to the transmitting node 1600 via the network, a control packet which includes one or more parameters related to the network status, such as an RTT and a packet loss rate. Furthermore, the control packet may include the above-described report. The packet including the report may be an RTCP (RTP control protocol) packet.

In the case of bidirectionally transmitting and receiving content data in a teleconference system, for example, the report created by the packet loss predicting unit 106 may be written in a packet including content data, such as an RTP packet transmitted to the party on the other end.

Regarding the OWD calculation, it is sufficient as long as an increase and a decrease in a relative OWD between the transmitting and receiving nodes can be measured, and it is unnecessary to synchronize the time managed by the transmitting node and the time managed by the receiving node. However, when there is a difference in time between the respective clocks of the transmitting and receiving nodes, the OWD calculating unit 201 calculates the OWD which does not include the impact of the increase and decrease in the OWD caused by the difference in time between the clocks.

The OWD calculating unit 201 may write, as the time history, one or both of the transmission time and the reception time of the packet into the accumulating unit 204, together with the OWD history.

Furthermore, the detecting unit 202 may exclude, from the target of detection of a sign of a packet loss, fluctuations in the OWD history that are obviously temporal or momentary.

Figure 10:
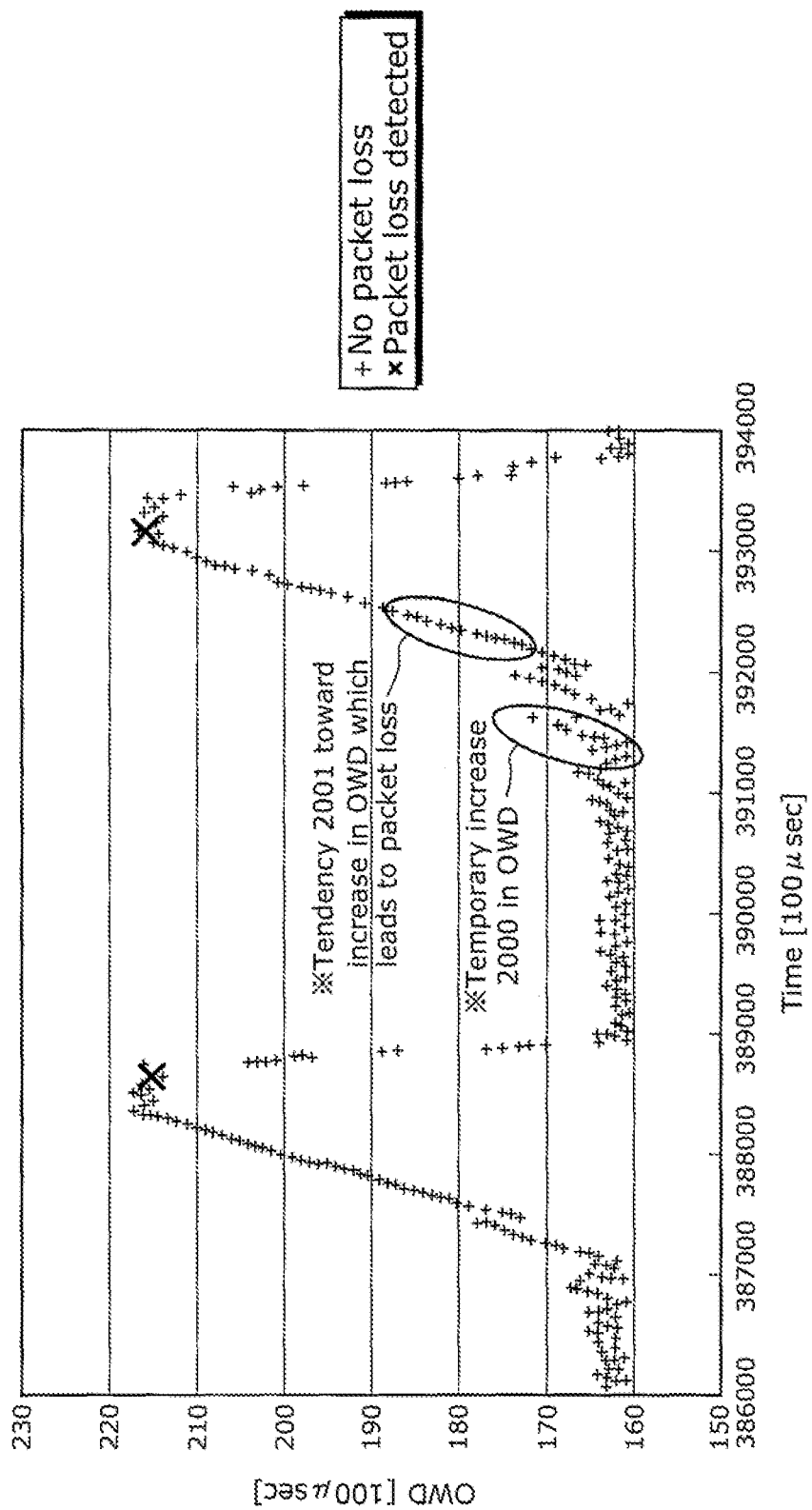
FIG. 10 is a graph showing a temporary increase in OWD.

FIG. 10 is a graph showing a temporary increase in the OWD.

In the case where the detecting unit 202 detects a temporary increase 2000 in OWD as a sign of a packet loss, the estimating unit 203 is likely to estimate a wrong packet loss time.

To only detect a tendency 2001 toward an increase in OWD which leads to a packet loss, the detecting unit 202 may divide the OWD history into any plural number of periods, and detect a sign of a packet loss when an average of one or more OWDs exceeds a predetermined value.

Furthermore, the detecting unit 202 may use a means to eliminate, from the target of the packet-loss-sign monitoring, a part which can be estimated as a momentary fluctuation in the OWD history. For example, the detecting unit 202 may calculate an average of OWDs included in a predetermined time period, and detect a sign of a packet loss when the calculated average exceeds a predetermined threshold.

The condition on which the detecting unit 202 detects a sign of a packet loss may be changed at any time, using one or more of the following parameters: a transmission interval and a reception interval that are time intervals between one packet and a next packet; an RTT; an OWD; a packet loss rate; and so on.

As an example, the following shows a method of detecting a sign of a packet loss in the case of using a packet receiving interval. Here, a sign of a packet loss is detected when the number of periods in which the OWD increases as compared to the OWD of an immediately-previously-received packet is equal to or greater than a first threshold. The first threshold is set so that it increases as the packet receiving interval decreases. Below is an example in which the detecting unit 202 detects a sign of a packet loss.

If 10 [msec]<Average packet receiving interval,
the first threshold is eight periods,
else if 5 [msec]<Average packet receiving interval≤10 [msec],
the first threshold is fifteen periods,
else if 1 [msec]<Average packet receiving interval≤5 [msec],
the first threshold is eighteen periods, and
else Average packet receiving interval≤1 [msec],
the first threshold is twenty periods.

The estimating unit 203 may exclude, from the OWD history to be used for the packet loss estimation, part which can be determined as temporal or momentary OWD fluctuations.

Furthermore, in the case where there is a plurality of routers in which packet losses will occur on the network, the estimating unit 203 may estimate a packet loss time for each router.

FIG. 11 shows OWDs held by the estimating unit 203, each being an OWD at the time of a packet loss that has occurred in a corresponding one of the routers.

The estimating unit 203 holds, for each router, data indicating whether or not a packet loss has occurred and an OWD at the time of the packet loss.

According to the OWDs at the time of the packet losses, the estimating unit 203 distinguishes the characteristics of the routers in which packet losses have occurred, and estimates a packet loss time for each router.

This enables accurate estimation of the packet loss time even when there is a plurality of routers in which packet losses will occur on the network.

In some cases, the OWD obtained by the estimating unit 203 increases at the rate of increase of the OWD accumulated in the accumulating unit. In such cases, the estimating unit 203 may estimate a packet loss time by adding, to (i) the transmission time, (ii) the reception time, or (iii) a time point between the transmission time and the reception time, a time it takes for the obtained OWD to reach the OWD at the time of a previous packet loss.

The coding rate and FEC redundancy determining unit 602 calculates an available network bandwidth or a network bandwidth available for transmission, from one or more parameters indicating the network status, such as a packet loss rate and an RTT. Next, the coding rate and FEC redundancy determining unit 602 may determine a coding rate of the content and the FEC redundancy according to the calculated value.

Furthermore, the packet transmitting unit 606 may add a transmission time to the control packet and transmit the resultant packet to the receiving node at a regular interval or at any time. Here, the control packet may be an RTCP packet:
(Variation 1)

Next, Variation 1 of Embodiment 1 is described.

The packet loss predicting unit included in the receiving node 1604 of Variation 1 estimates a packet loss time period that is a predetermined time period including a time at which a packet loss is predicted to occur.

Hereinafter, a description is provided centering on the difference from the packet loss predicting unit 106 of Embodiment 1.

Figure 12:
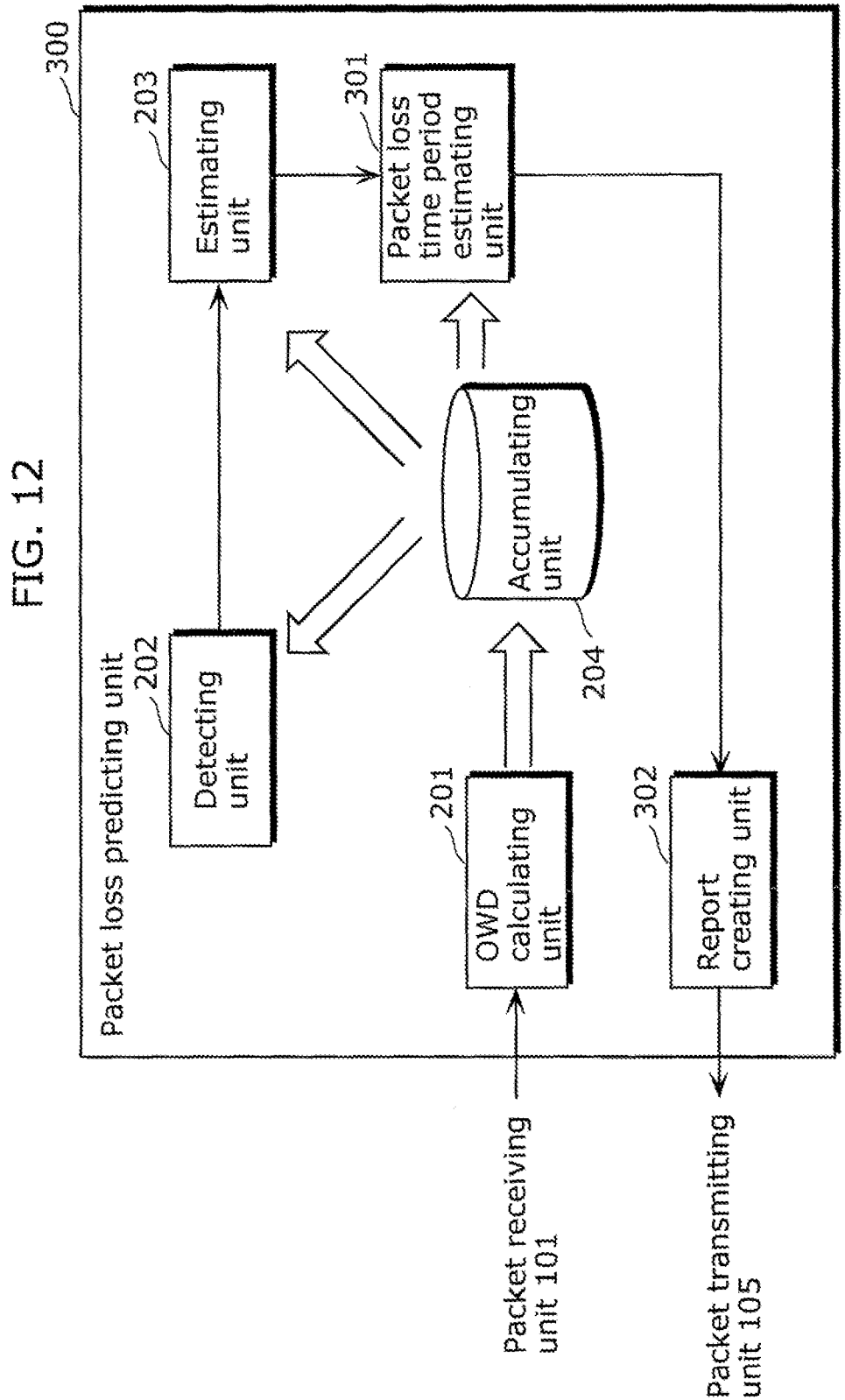
FIG. 12 is a block diagram showing a detailed structure of a packet loss predicting unit of a streaming communication device according to Variation 1 of Embodiment 1.

FIG. 12 is a block diagram showing a detailed structure of a packet loss predicting unit 300 according to Variation 1.

The packet loss predicting unit 300 is different from the packet loss predicting unit 106 in further including a packet loss time period estimating unit 301.

The packet loss time period estimating unit 301 calculates, based on the packet loss time calculated by the estimating unit 203, a packet loss time period that is a time period in which a packet loss is likely to occur. The estimated packet loss time period refers to a time period between a time point earlier than the estimated packet loss time by a predetermined first time period and a time point later than the estimated packet loss time by a predetermined second time period.

A report creating unit 302 creates a report including the value of the estimated packet loss time period.

Furthermore, the coding rate and FEC redundancy determining unit 602 of the transmitting node 1600 increases the FEC redundancy for content data which is to be transmitted in the estimated packet loss time period.

This enables the streaming communication device of Variation 1 to estimate, as the packet loss time period, a predetermined time period including the time at which a packet loss will occur. As a result, it is possible to prevent, at any time during the estimated packet loss time period, a loss of content data caused by a packet loss.

Note that the coding rate and FEC redundancy determining unit 602 may decrease the FEC redundancy for content data which is to be transmitted in a time period other than the estimated packet loss time period.

Furthermore, the accumulating unit 204 may accumulate, as a sequence number history, a sequence number corresponding to a received packet.

In addition, the packet loss time period estimating unit 301 may estimate the packet loss time period from the estimated packet loss time and at least one of the OWD history, the time history, and the sequence number history which are held by the accumulating unit 204. The packet loss time period estimating unit 301 may also estimate the packet loss time period using: the estimated packet loss time; at least one of the OWD history, the time history, and the sequence number history; and a parameter such as an RTT.

(Variation 2)

Next, Variation 2 of Embodiment 1 is described.

The packet loss predicting unit included in the receiving node 1604 of Variation 2 estimates a sequence number corresponding to a packet predicted to be lost.

Hereinafter, a description is provided centering on the difference from the packet loss predicting unit 106 of Embodiment 1.

Figure 13:
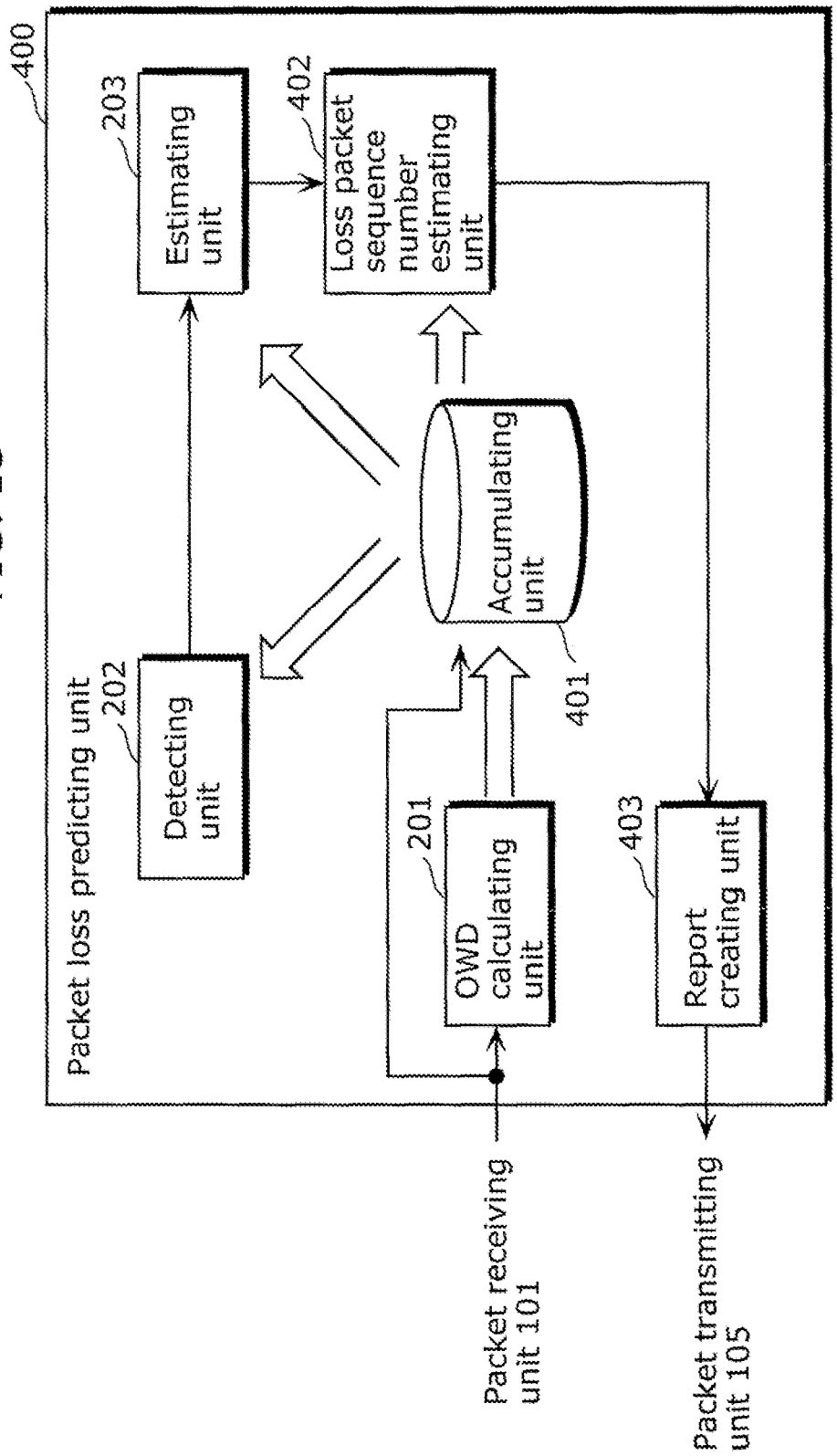
FIG. 13 is a block diagram showing a detailed structure of a packet loss predicting unit of a streaming communication device according to Variation 2 of Embodiment 1.

FIG. 13 is a block diagram showing a detailed structure of a packet loss predicting unit 400 according to Variation 2.

The packet loss predicting unit 400 is different from the packet loss predicting unit 106 in further including a loss packet sequence number estimating unit 402. Furthermore, the accumulating unit 401 is different from the accumulating unit 204 in further accumulating, as a sequence number history, a sequence number corresponding to a received packet.

The loss packet sequence number estimating unit 402 estimates, from the packet loss time estimated by the estimating unit 203 and the sequence number history held by the accumulating unit 401, a loss packet sequence number corresponding to a packet predicted to be lost.

The report creating unit 403 creates a report including the estimated loss packet sequence number.

The coding rate and FEC redundancy determining unit 602 included in the transmitting node 1600 increases the FEC redundancy for the packet corresponding to the estimated loss packet sequence number.

In such a manner, the streaming communication device of Variation 2 estimates a packet which will be lost, by estimating the sequence number corresponding to the packet which will be lost. In addition, the streaming communication device of Variation 2 can prevent a loss of content data of the packet corresponding to the sequence number for which a packet loss is predicted to occur.

Note that the coding rate and FEC redundancy determining unit 602 may decrease the FEC redundancy for the content data of a packet corresponding to a sequence number other than the estimated loss packet sequence number.

Furthermore, the loss packet sequence number estimating unit 402 may estimate the loss packet sequence number from the sequence number history and a combination of at least two of: the packet loss time estimated by the estimating unit 203; the OWD history held by the accumulating unit 401; and the time history held by the accumulating unit 401.

The loss packet sequence number estimating unit 402 may also estimate the loss packet sequence number in the following manner. That is, the loss packet sequence number may be estimated using the sequence number history, a combination of at least two of: the packet loss time estimated by the estimating unit 203; the OWD history held by the accumulating unit 401; and the time history held by the accumulating unit 401, and a parameter such as an RTT.

The report creating unit 403 may further create a report including the estimated packet loss time.

(Variation 3)

Next, Variation 3 of Embodiment 1 is described.

The packet loss predicting unit included in the receiving node 1604 of Variation 3 estimates a set of loss packet sequence numbers corresponding to a plurality of packets predicted to be lost.

Hereinafter, a description is provided centering on the difference from Variation 1 of Embodiment 1.

Figure 14:
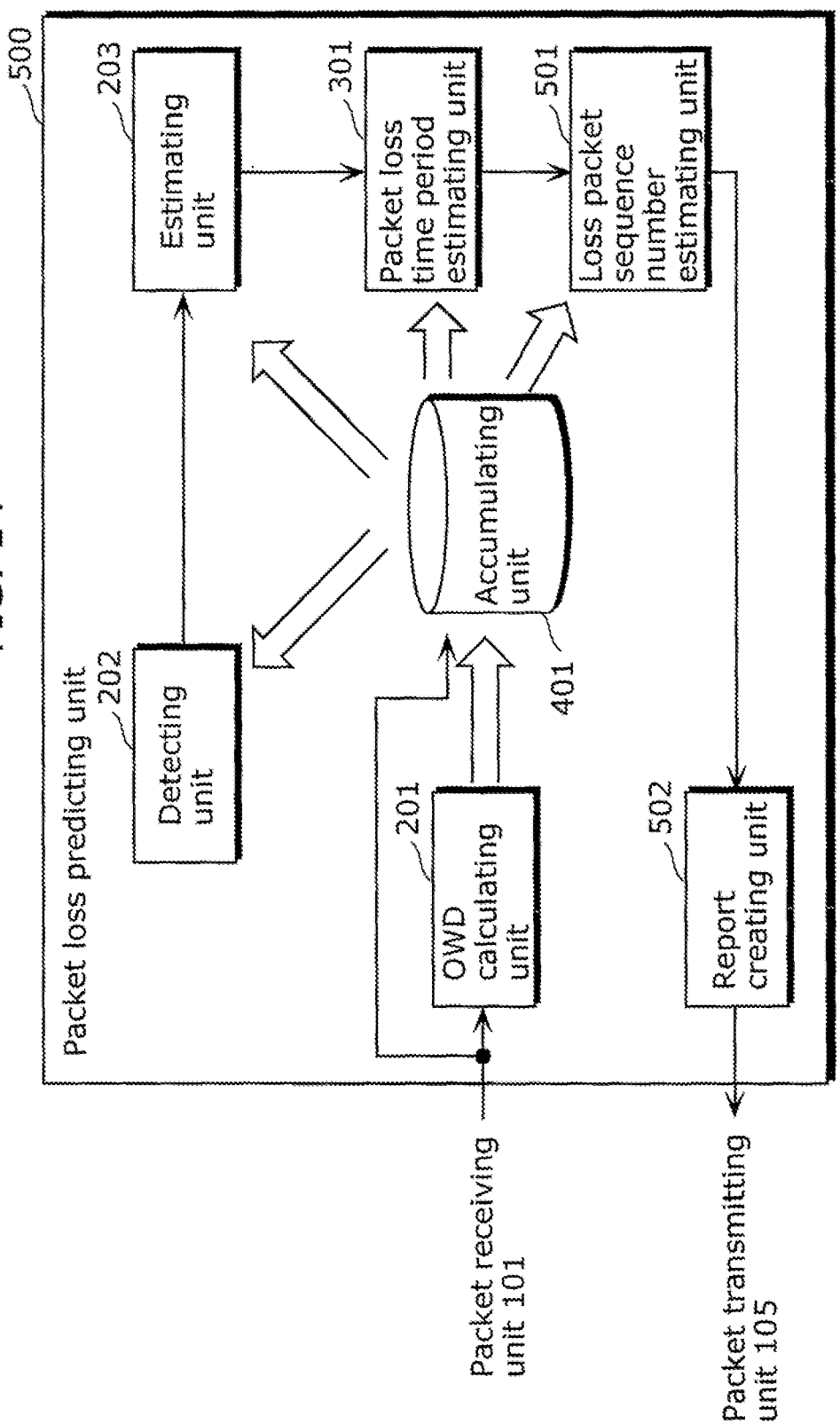
FIG. 14 is a block diagram showing a detailed structure of a packet loss predicting unit of a streaming communication device according to Variation 3 of Embodiment 1.

FIG. 14 is a block diagram showing a detailed structure of a packet loss predicting unit 500 according to Variation 3.

The packet loss predicting unit 500 is different from the packet loss predicting unit 300 in further including a loss packet sequence number estimating unit 501.

The loss packet sequence number estimating unit 501 estimates a set of loss packet sequence numbers from the packet loss time period estimated by the packet loss time period estimating unit 301 and the sequence number history held by the accumulating unit 401.

The report creating unit 502 creates a report including the estimated set of loss packet sequence numbers. Furthermore, the coding rate and FEC redundancy determining unit 602 included in the transmitting node 1600 increases the FEC redundancy for the packets corresponding to the estimated set of loss packet sequence numbers.

In such a manner, the streaming communication device of Variation 3 estimates a plurality of packets which will be lost, by estimating a plurality of sequence numbers corresponding to the plurality of packets predicted to be lost. In addition, the streaming communication device of Variation 3 can prevent a loss of the content data of the plurality of packets estimated.

Note that the coding rate and FEC redundancy determining unit 602 may decrease the FEC redundancy for content data of a packet corresponding to a sequence number other than the estimated set of loss packet sequence numbers.

Furthermore, the loss packet sequence number estimating unit 501 may estimate the set of loss packet sequence numbers from the sequence number history and a combination of at least two of: the estimated packet loss time period; the OWD history held by the accumulating unit 401; and the time history held by the accumulating unit 401.

Moreover, the loss packet sequence number estimating unit 501 may also estimate the set of loss packet sequence numbers using the sequence number history, a combination of at least two of: the estimated packet loss time period; the OWD history; and the time history, and a parameter such as an RTT.

The report creating unit 502 may further create a report including at least one of the estimated packet loss time, the estimated packet loss time period, and the estimated set of loss packet sequence numbers.

(Variation 4)

Next, Variation 4 of Embodiment 1 is described.

The packet transmitting unit 606 included in the transmitting node 1600 of Variation 4 transmits (i) a packet which is to be transmitted at the packet loss time estimated by the receiving node 1604 and (ii) a duplicate of such a packet.

Hereinafter, a description is provided centering on the difference from Embodiment 1.

Figure 15:
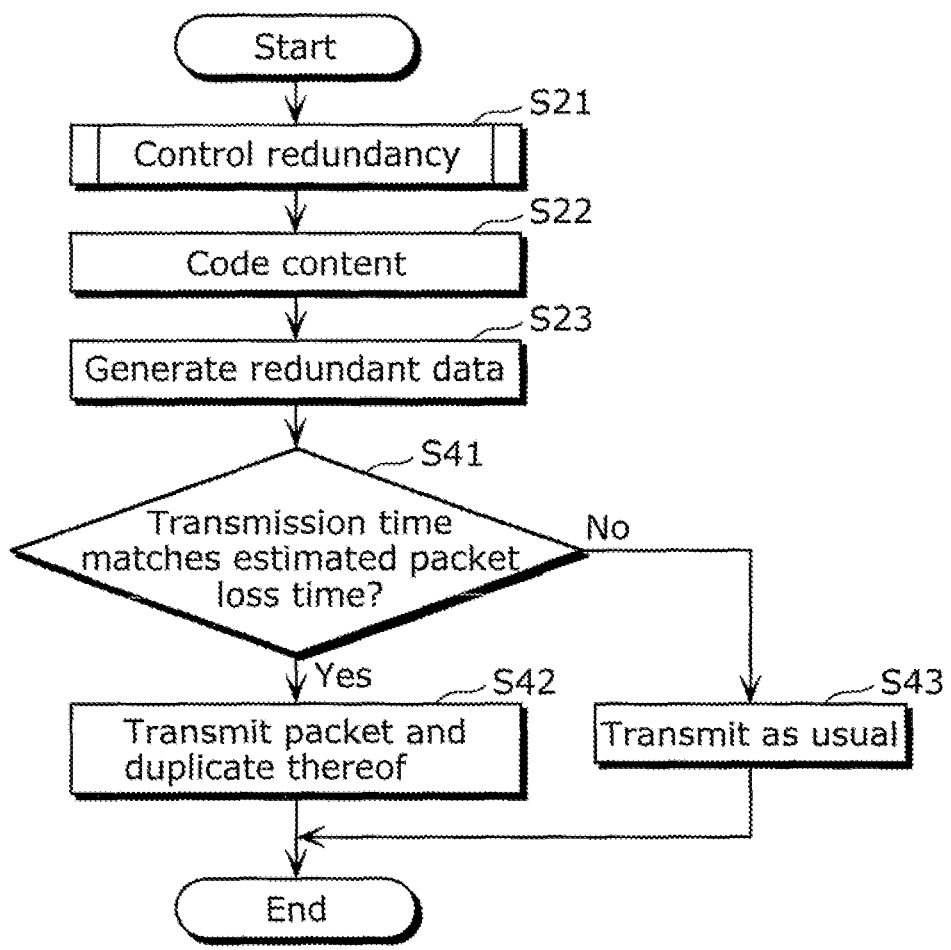
FIG. 15 is a flowchart showing a processing flow of processing units included in a transmitting node which is a streaming communication device according to Variation 4 of Embodiment 1, except a packet receiving unit and a predicted loss time holding unit.

FIG. 15 is a flowchart showing a processing flow of processing units included in the transmitting node of Variation 4 except the packet receiving unit 601 and the predicted loss time holding unit 607.

Note that the processing performed by the packet receiving unit 601 and the predicted loss time holding unit 607 are the same as that shown in FIG. 7B.

The flowchart of FIG. 15 is different from that shown in FIG. 7A in further including the following processing after generation of redundant data (S23): determination as to whether or not the transmission time matches the estimated packet loss time, and transmission of the packet and a duplicate thereof. Hereinafter, the difference from FIG. 7A is described.

The packet transmitting unit 606 determines whether or not the transmission time matches the estimated packet loss time held by the predicted loss time holding unit 607 (S41).

In the case where the transmission time matches the estimated packet loss time (Yes), the packet transmitting unit 606 transmits the packet and a duplicate thereof. Transmitting a packet and a duplicate thereof means transmitting the same packet twice consecutively S42).

In the case where, the transmission time does not match the estimated packet loss time (No), the packet transmitting unit 606 transmits the packet once as usual (S43).

This enables the streaming communication device of Variation 4 to recover content data using the transmitted duplicate of the content data when a packet loss occurs at the estimated packet loss time.

Note that the packet transmitting unit 606 may transmit packets which are to be transmitted in the estimated packet loss time period and duplicates of such packets.

Furthermore, the packet transmitting unit 606 may transmit either the packet corresponding to the estimated loss packet sequence number and a duplicate of such a packet, or packets corresponding to sequence numbers included in the estimated set of loss packet sequence numbers and duplicates of such packets.

Embodiment 2

Next, Embodiment 2 of the present invention is described.

The streaming communication device of Embodiment 2 is different from the streaming communication device of Embodiment 1 in that the transmitting node estimates a time at which a packet loss will occur.

Hereinafter, a description is provided centering on the difference from Embodiment 1.

Figure 16:
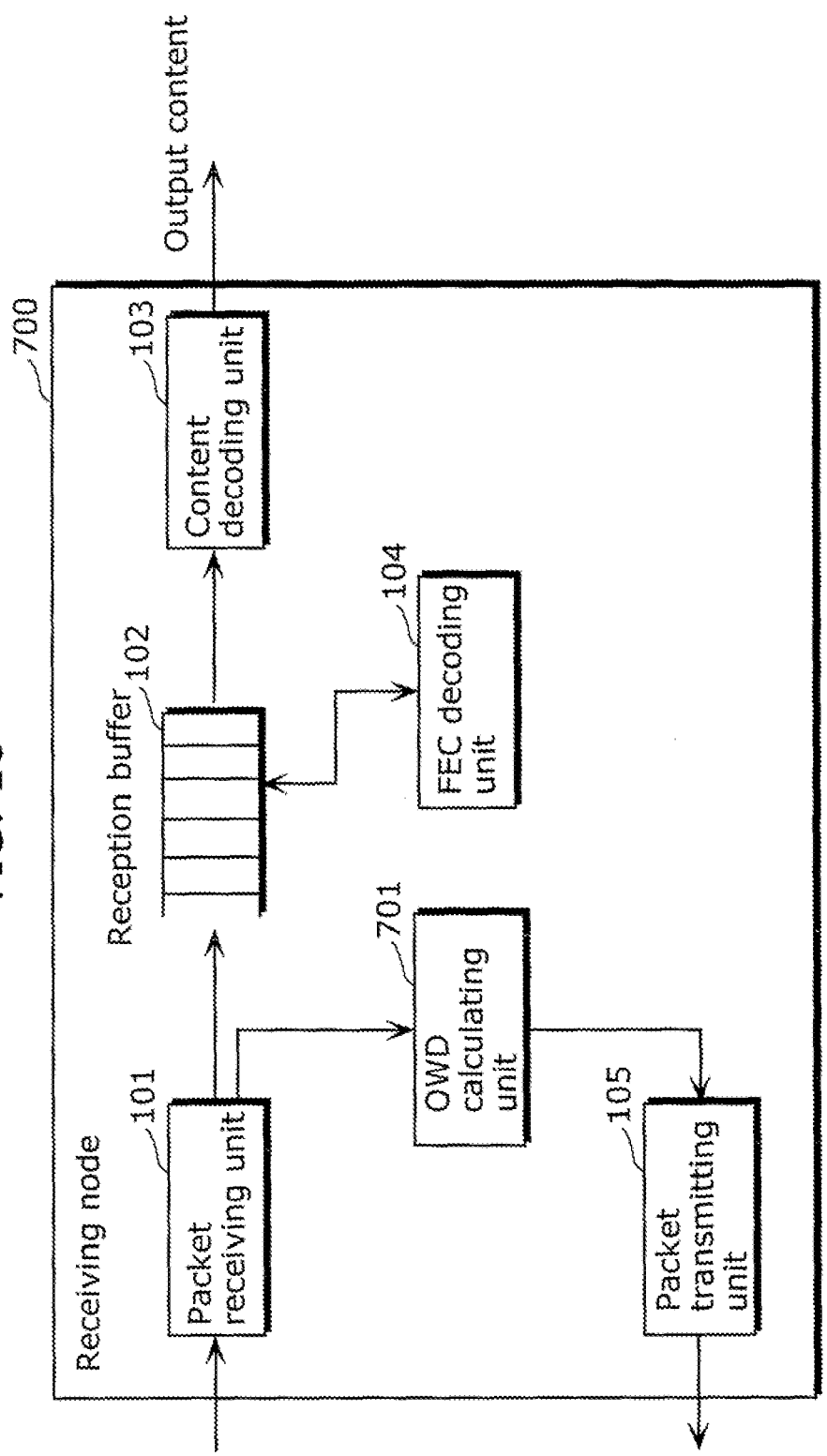
FIG. 16 is a block diagram showing a structure of a receiving node which is a streaming communication device according to Embodiment 2.

FIG. 16 is a block diagram of a receiving node 700 according to Embodiment 2.

The receiving node 700 is different from the receiving node 1604 of Embodiment 1 in including an OWD calculating unit 701 in place of the packet loss predicting unit 106.

The OWD calculating unit 701 calculates an OWD based on a transmission time added to a packet and a time at which the receiving node 700 has received the packet. Furthermore, the OWD calculating unit 701 creates a report including the calculated OWD, and outputs the report to the packet transmitting unit 105.

This enables the receiving node 700 of Embodiment 2 to calculate the OWD of the received packet and notify the transmitting node of the OWD.

Next, the transmitting node of Embodiment 2 is described.

Figure 17:
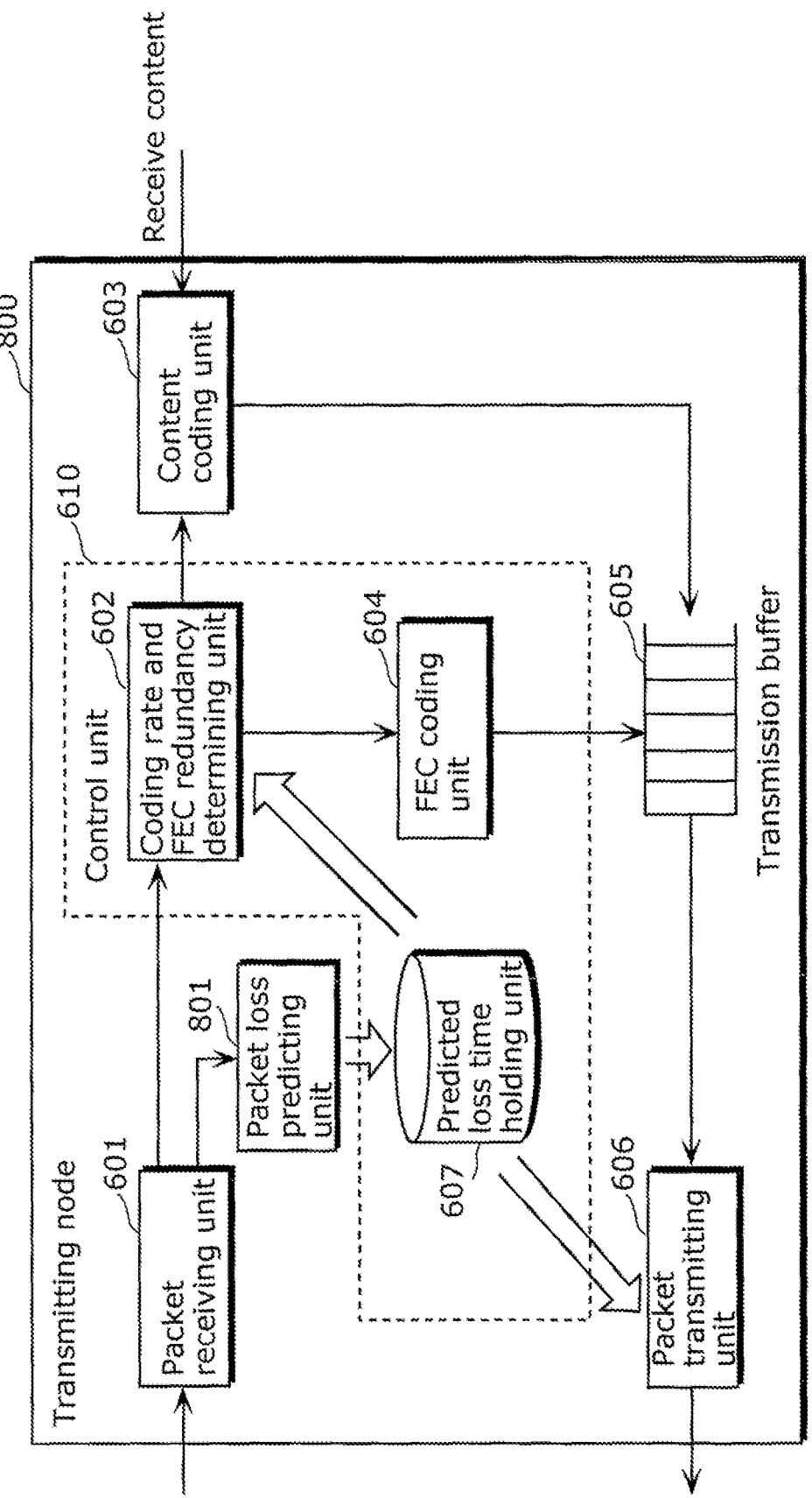
FIG. 17 is a block diagram showing a structure of a transmitting node which is a streaming communication device according to Embodiment 2.

FIG. 17 is a block diagram of a transmitting node 800 according to Embodiment 2.

The transmitting node 800 is different from the transmitting node 1600 of Embodiment 1 in further including a packet loss predicting unit 801.

Hereinafter, a description is provided centering on the difference from Embodiment 1.

The packet loss predicting unit 801 estimates a time in future at which a packet loss is predicted to occur, using information related to the OWD received via the packet receiving unit 601.

The packet receiving unit 601 receives the report including the OWD from the receiving node 700, and outputs the OWD to the packet loss predicting unit 801. The packet loss predicting unit 801 detects a sign of a packet loss from the OWD, estimates a packet loss time at which a packet loss will occur, and outputs the estimated packet loss time to the control unit 610.

Figure 18:
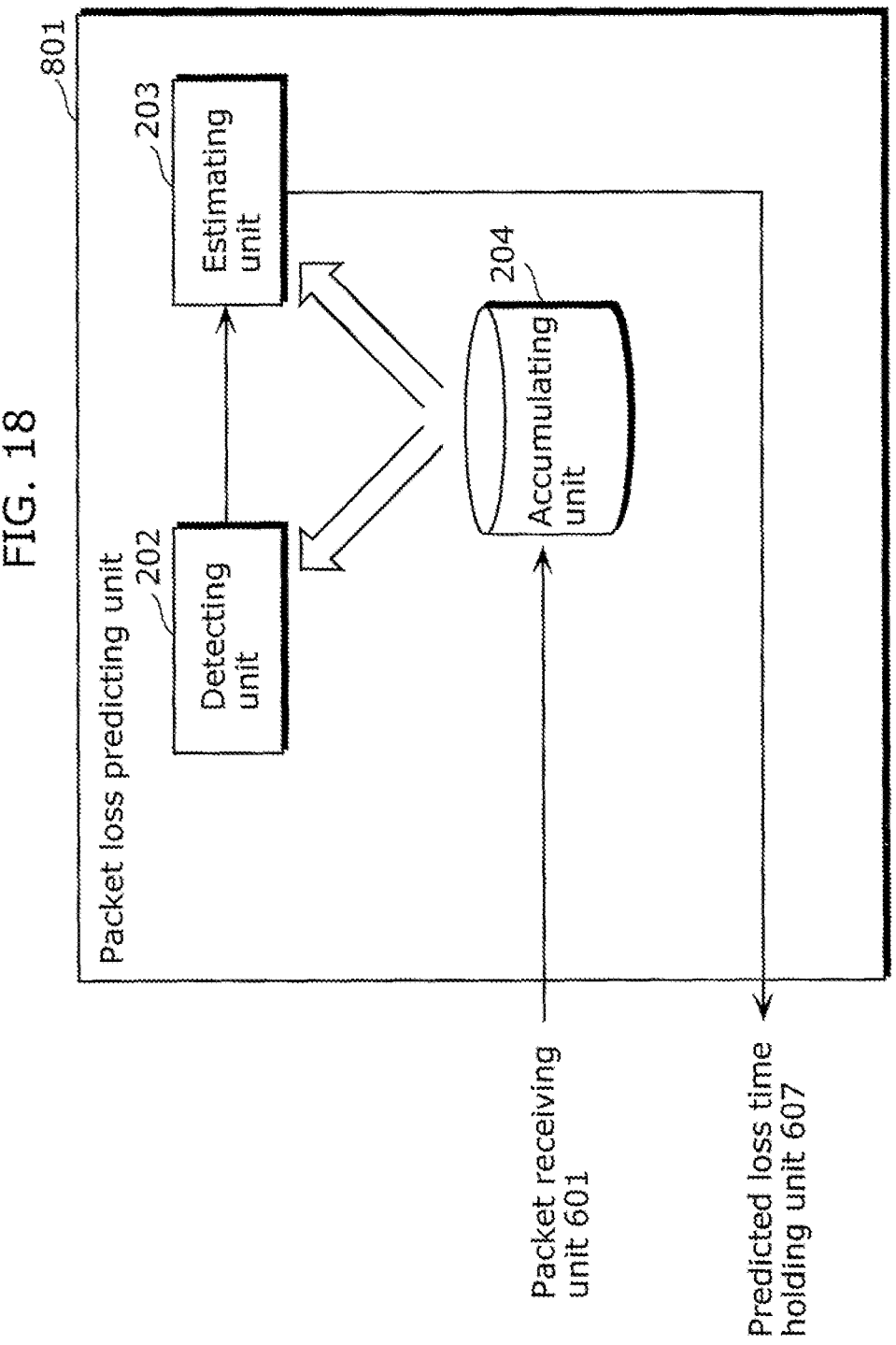
FIG. 18 is a block diagram showing a detailed structure of a packet loss predicting unit of a streaming communication device according to Embodiment 2.

FIG. 18 is a block diagram showing an example of a detailed structure of the packet loss predicting unit 801.

The packet loss predicting unit 801 is different from the packet loss predicting unit 106 included in the receiving node 1604 of Embodiment 1 in not including the OWD calculating unit 201 or the report creating unit 205.

The packet loss predicting unit 801 detects a sign of a packet loss from the OWD received via the packet receiving unit 601, and estimates a packet loss time at which a packet loss is predicted to occur. Furthermore, the packet loss predicting unit 801 outputs the estimated packet loss time to the predicted loss time holding unit 607.

Based on the estimated packet loss time, the control unit 610 controls a packet to be transmitted.

In such a manner, the transmitting node 800 of Embodiment 2 can control the FEC redundancy and prevent a packet loss based on the OWD calculated by the receiving node 700.

Next, a processing flow of the streaming communication device according to Embodiment 2 is described.

Figure 19:
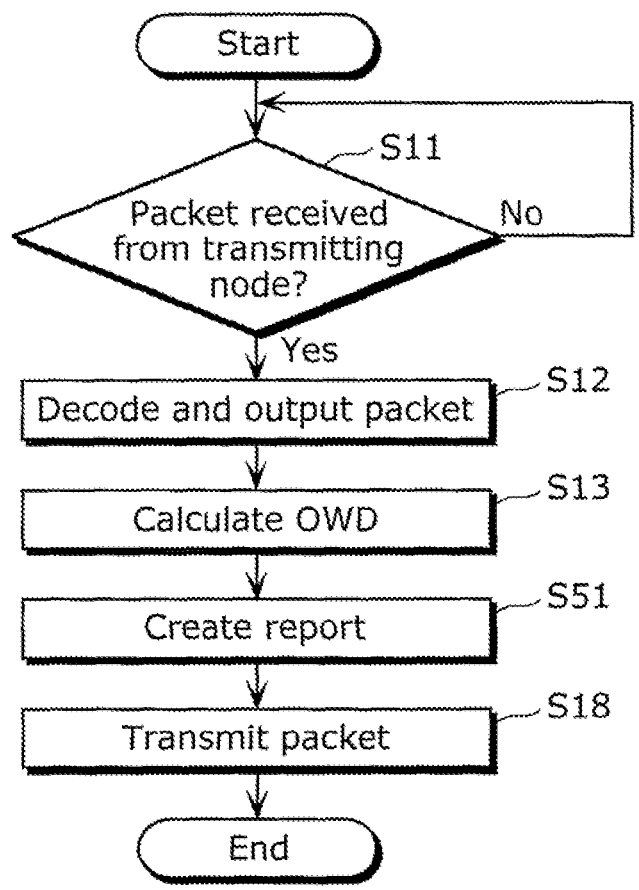
FIG. 19 is a flowchart showing a processing flow of a receiving node which is a streaming communication device according to Embodiment 2.

FIG. 19 is a flowchart showing a processing flow of the receiving node 700 according to Embodiment 2.

The flowchart of the receiving node 700 according to Embodiment 2 is different from the flowchart of the receiving node 1604 according to Embodiment 1 in including almost none of the processing performed by the packet loss predicting unit 106 and only including the processing performed by the OWD calculating unit 701.

The packet receiving unit 101 monitors whether or not a packet is received from the transmitting node 800 (S11). In the case where no packet is received (No in S11), the packet receiving unit 101 continues to monitor whether or not a packet is received from the transmitting node 800.

In the case where a packet is received (Yes in S11), the packet receiving unit 101 stores the packet in the reception buffer 102. The FEC decoding unit 104 recovers a lost packet using redundant data of the packet stored in the receiving buffer 102. The content decoding unit 103 extracts and decodes content data of the recovered packet, and outputs the resultant content (S12).

Furthermore, the packet receiving unit 101 outputs the received packet to the OWD calculating unit 701.

The OWD calculating unit 701 calculates an OWD based on (i) a transmission time which is the time at which the packet has been transmitted from the transmitting node 800 and is added to the packet and (ii) a reception time at which the packet has been received (S13). Furthermore, the OWD calculating unit 701 creates a report including the OWD (S51).

The packet transmitting unit 105 transmits a packet including the report to the transmitting node 800 (S18).

Next, a processing flow of the transmitting node 800 is described.

Figure 20:
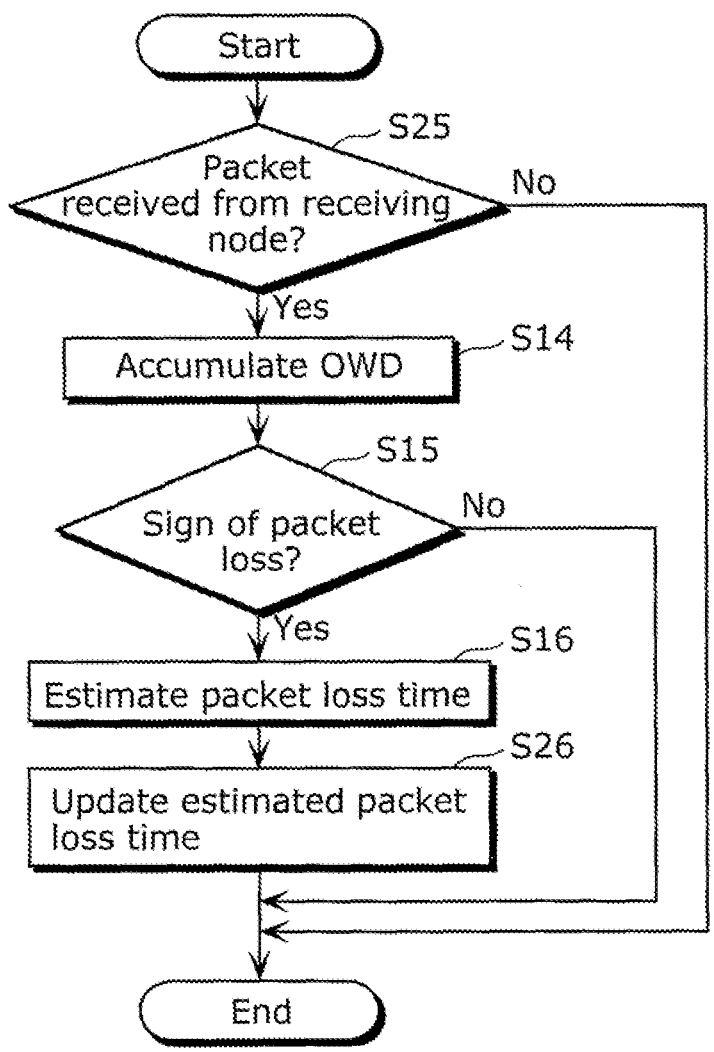
FIG. 20 is a flowchart showing a processing flow of a packet receiving unit, a packet loss predicting unit, and a predicted loss time holding unit included in a transmitting node which is a streaming communication device according to Embodiment 2.

FIG. 20 is a flowchart showing a processing flow of the packet receiving unit 601, the packet loss predicting unit 801, and the predicted loss time holding unit 607 included in the transmitting node 800 of Embodiment 2.

The packet receiving unit 601 determines whether or not a packet is received from the receiving node 700 (S25). In the case where a packet is received (Yes in S25), the packet receiving unit 601 stores the OWD in the accumulating unit 204 included in the packet loss predicting unit 801 (S14).

The detecting unit 202 detects a sign of a packet loss from the OWD history stored in the accumulating unit 204 (S15).

In the case where the detecting unit 202 detects a sign of a packet loss (Yes), the estimating unit 203 estimates a packet loss time (S16), and updates the estimated packet loss time stored in the predicted loss time holding unit 607 (S26).

In the case where the packet receiving unit 601 receives no packet (No in S25) and in the case where the detecting unit 202 does not detect a sign of a packet loss (No in S15), nothing is performed and the processing is terminated.

The processing of the processing units included in the transmitting node 800, except the packet receiving unit 601, the packet loss predicting unit 801, and the predicted loss time holding unit 607, are the same as that shown in FIG. 7A.

In such a manner as above, the receiving node 700 of Embodiment 2 calculates the OWD. The transmitting node 800 accumulates the OWD calculated by the receiving node 700, and accurately estimates, from the accumulated OWD, a time at which a packet loss will occur. Furthermore, the transmitting node 800 increases the FEC redundancy for a time point at which a packet loss is likely to occur. This prevents a loss of content data caused by a packet loss.

(Variation 1)

Next, Variation 1 of Embodiment 2 is described.

The packet loss predicting unit included in the transmitting node 800 of Variation 1 estimates a packet loss time period in which a packet loss is predicted to occur.

Hereinafter, a description is provided centering on the difference from the packet loss predicting unit 801 included in the receiving node 700 of Embodiment 2.

Figure 21:
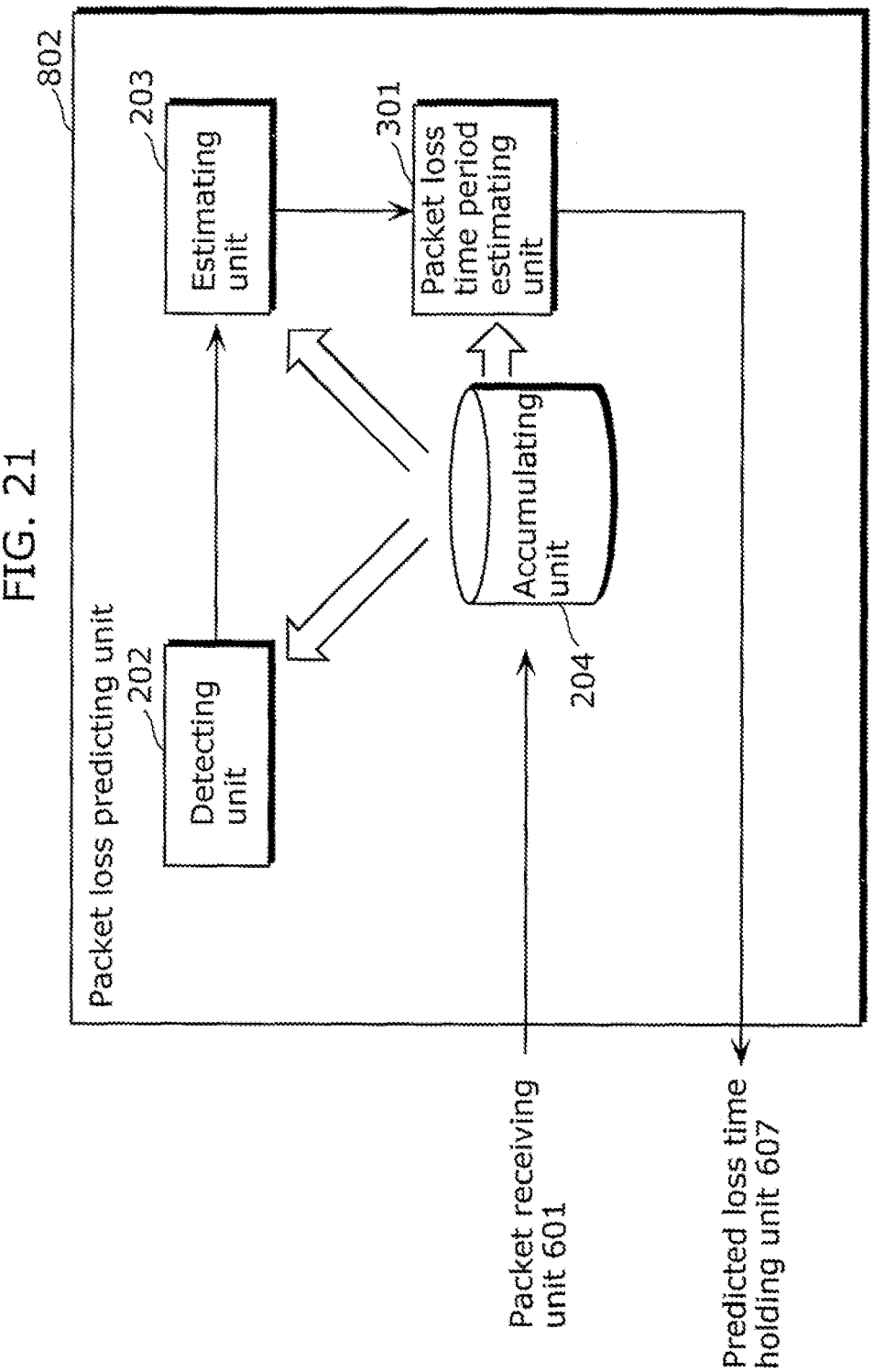
FIG. 21 is a block diagram showing a detailed structure of a packet loss predicting unit of a streaming communication device according to Variation 1 of Embodiment 2.

FIG. 21 is a block diagram showing a detailed structure of a packet loss predicting unit 802 according to Variation 1.

The packet loss predicting unit 802 is different from the packet loss predicting unit 801 in further including a packet loss time period estimating unit 301. The packet loss time period estimating unit 301 calculates a packet loss time period based on the packet loss time calculated by the estimating unit 203.

The coding rate and FEC redundancy determining unit 602 increases the FEC redundancy for the content data which is to be transmitted in the estimated packet loss time period.

This enables the streaming communication device of Variation 1 to estimate, as the packet loss time period, a predetermined time period including the time at which a packet loss will occur. As a result, it is possible to prevent, at any time in the estimated packet loss time period, a loss of content data caused by a packet loss.

(Variation 2)

Next, Variation 2 of Embodiment 2 is described.

The packet loss predicting unit included in the transmitting node 800 of Variation 2 estimates a sequence number of a packet predicted to be lost.

Hereinafter, a description is provided centering on the difference from the packet loss predicting unit 801 included in the transmitting node 800 of Embodiment 2.

Figure 22:
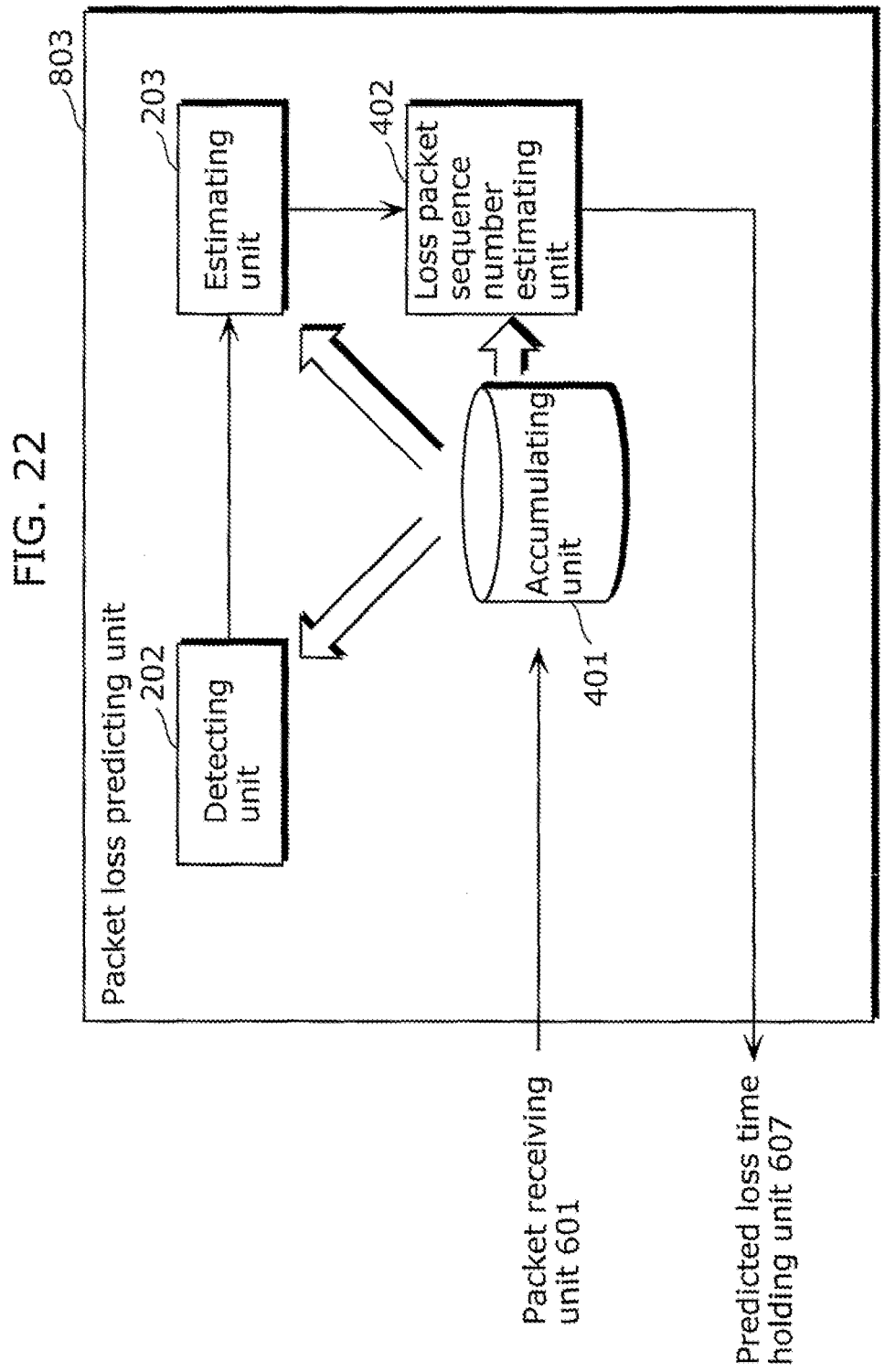
FIG. 22 is a block diagram showing a detailed structure of a packet loss predicting unit of a streaming communication device according to Variation 2 of Embodiment 2.

FIG. 22 is a block diagram showing a detailed structure of a packet loss predicting unit 803 according to Variation 2.

The packet loss predicting unit 803 is different from the packet loss predicting unit 801 in further including a loss packet sequence number estimating unit 402.

Furthermore, the accumulating unit 401 is different from the accumulating unit 204 in further accumulating, as a sequence number history, a sequence number corresponding to a received packet.

The loss packet sequence number estimating unit 402 estimates a loss packet sequence number from the packet loss time estimated by the estimating unit 203 and the sequence number history held by the accumulating unit 401.

The coding rate and FEC redundancy determining unit 602 increases the FEC redundancy for a packet corresponding to the estimated loss packet sequence number.

This enables the streaming communication device of Variation 2 to prevent a loss of content data of the packet corresponding to the sequence number for which a packet loss is predicted to occur.

(Variation 3)

Next, Variation 3 of Embodiment 2 is described.

The packet loss predicting unit included in the transmitting node 800 of Variation 3 estimates a set of loss packet sequence numbers corresponding to a plurality of packets predicted to be lost.

Hereinafter, a description is provided centering on the difference from Variation 1 of Embodiment 2.

Figure 23:
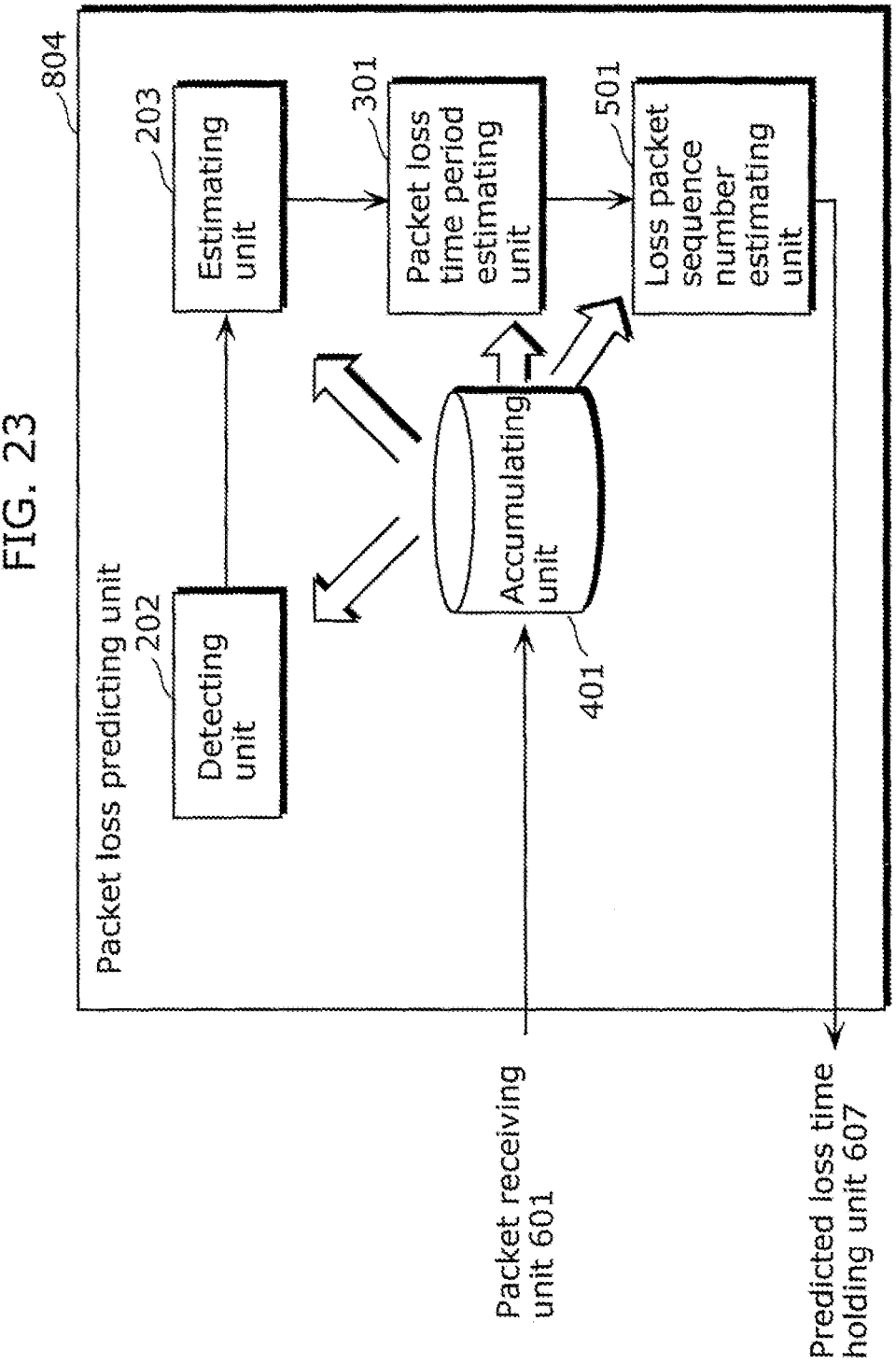
FIG. 23 is a block diagram showing a detailed structure of a packet loss predicting unit of a streaming communication device according to Variation 3 of Embodiment 2.
Figure 24:
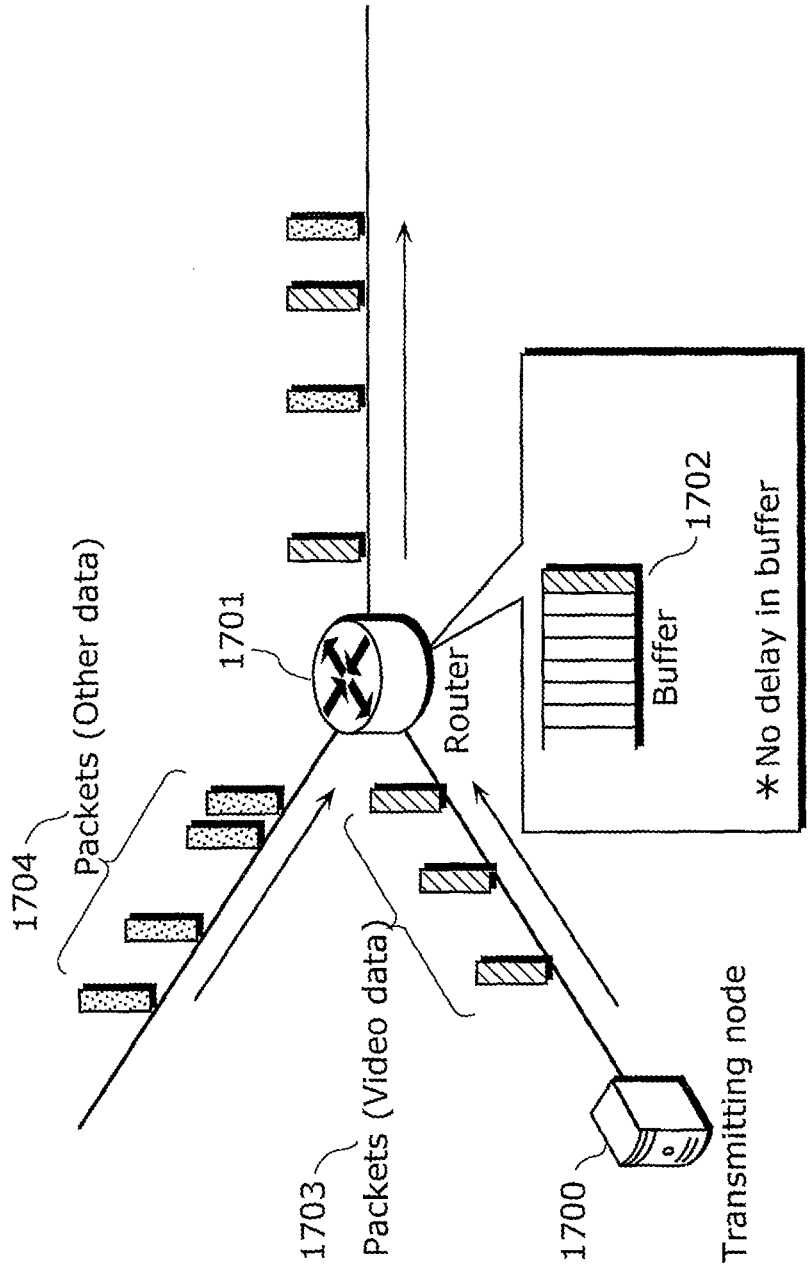
FIG. 24 shows an example of occurrence of congestion in a router.
Figure 25:
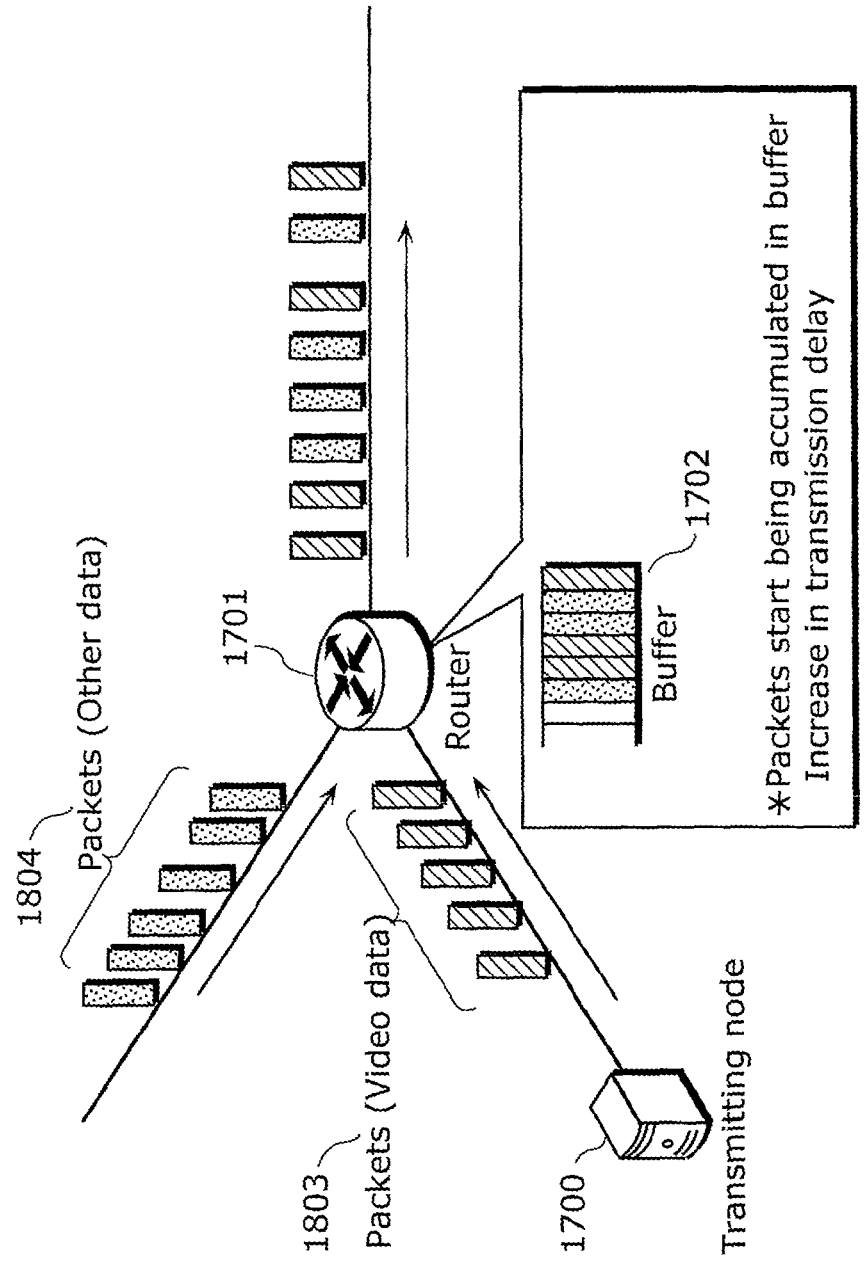
FIG. 25 shows another example of occurrence of congestion in a router.
Figure 26:
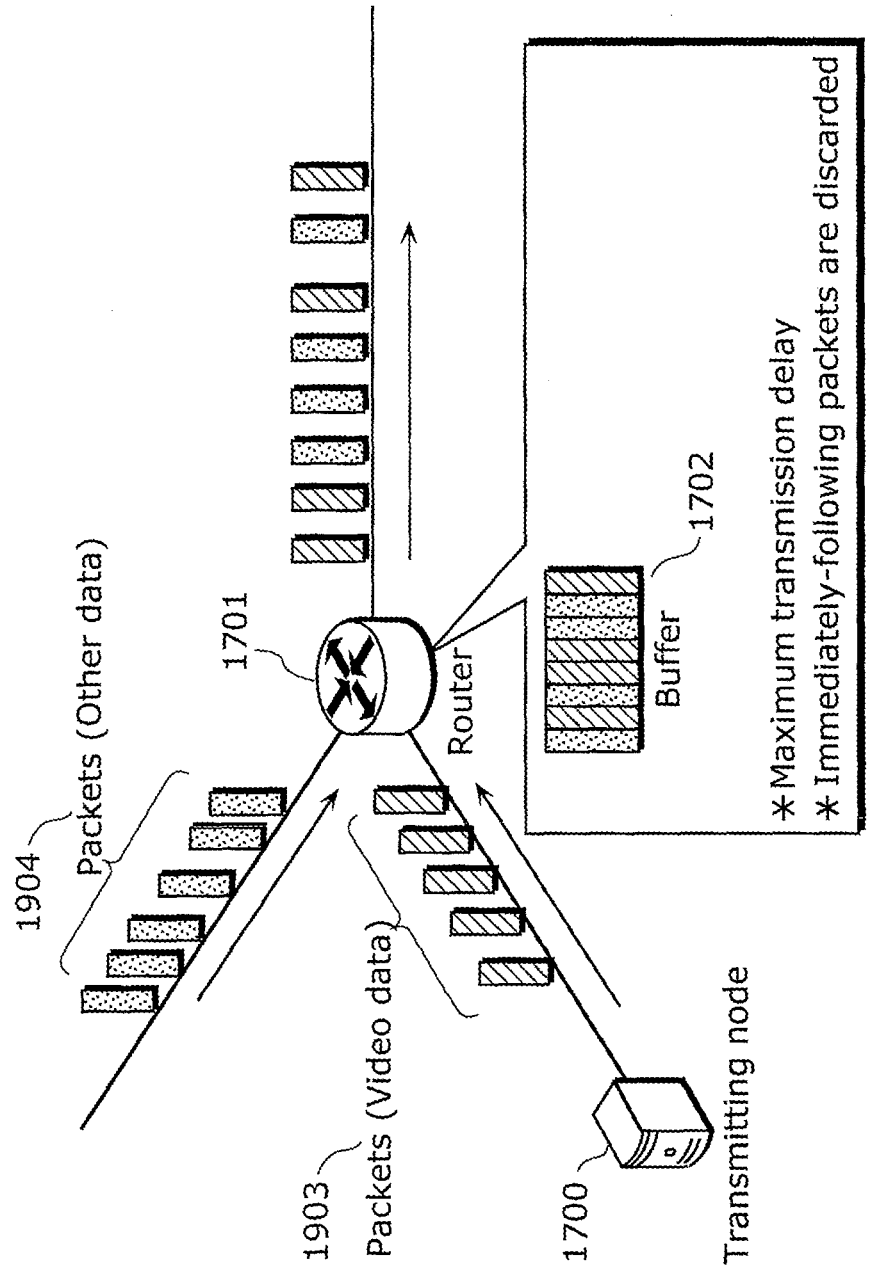
FIG. 26 shows yet another example of occurrence of congestion in a router.

FIG. 23 is a block diagram showing a detailed structure of a packet loss predicting unit 804 according to Variation 3.

The packet loss predicting unit 804 is different from the packet loss predicting unit 802 in further including a loss packet sequence number estimating unit 501.

The loss packet sequence number estimating unit 501 estimates a set of loss packet sequence numbers from the packet loss time period estimated by the packet loss time period estimating unit 301 and the sequence number history held by the accumulating unit 401.

The coding rate and FEC redundancy determining unit 602 increases the FEC redundancy for the packets corresponding to the set of loss packet sequence numbers estimated by the loss packet sequence number estimating unit.

In such a manner, the streaming communication device of Variation 3 estimates packets which will be lost, by estimating a set of sequence numbers of the packets which will be lost. In addition, the streaming communication device of Variation 3 can prevent a loss of content data of the packets corresponding to the set of sequence numbers for which a packet loss is predicted to occur.

(Variation 4)

Next, Variation 4 of Embodiment 2 is described.

The packet transmitting unit 606 included in the transmitting node 800 of Variation 4 transmits (i) a packet which is to be transmitted at the packet loss time estimated by the packet loss predicting unit 801 and (ii) a duplicate of such a packet.

This enables the streaming communication device of Variation 4 to recover content data using the transmitted duplicate of the content data when a packet loss occurs at the estimated packet loss time.

Note that the packet transmitting unit 606 may transmit packets which are to be transmitted in the estimated packet loss time period, and duplicates of such packets.

Furthermore, the packet transmitting unit 606 may transmit either a packet corresponding to the estimated loss packet sequence number and a duplicate of such a packet, or packets corresponding to sequence numbers included in the estimated set of loss packet sequence numbers and duplicates of such packets.

Although the present invention has been described based on embodiments and variations, the present invention is not limited to such embodiments and variations. Those skilled in the art will readily appreciate that many modifications are possible in the exemplary embodiments without materially departing from the novel teachings and advantages of this invention. Accordingly, all such modifications are intended to be included within the scope of this invention.

Furthermore, the present invention can be realized not only as a device but also as a method which includes, as steps, the processing units included in the device, and as a system which includes the device.

For example, packets other than a packet which will be lost may include no redundant data.

In addition, the transmitting node may transmit packets at predetermined time intervals, and the receiving node may also receive packets at predetermined time intervals. In such a case, the packet loss predicting unit may estimate, only from the OWD history, the time at which a packet loss will occur or a packet which will be lost, without using the time history.

As described above, the streaming communication device according to the present invention (i) identifies a tendency toward an increase in a one-way delay that is a time period between transmission and reception of a packet which includes a small segment of a stream, and upon detecting a sign of a packet loss, (ii) estimates, from a degree of the increase in the one-way delay, a loss packet that is a packet which will be lost. Thus, the streaming communication device is useful as a videophone and a streaming distribution device used in bidirectional communication.

| [Reference Signs List] | |
|---|---|
| T0, T1, T2 | Time |
| 101, 601 | Packet receiving unit |
| 102 | Reception buffer |
| 103 | Content decoding unit |
| 104 | FEC decoding unit |
| 105, 606 | Packet transmitting unit |
| 106, 300, 400, 500, 801, 802, 803, 804 | Packet loss predicting unit |
| 201 | OWD calculating unit |
| 202 | Detecting unit |
| 203 | Estimating unit |
| 204, 401 | Accumulating unit |
| 205, 302, 403, 502 | Report creating unit |
| 301 | Packet loss time period estimating unit |
| 402, 501 | Loss packet sequence number estimating unit |
| 602 | Coding rate and FEC redundancy determining unit |
| 603 | Content coding unit |
| 604 | FEC coding unit |
| 605 | Transmission buffer |
| 606 | Packet transmitting unit |
| 607 | Predicted loss time holding unit |
| 610 | Control unit |
| 700, 1604 | Receiving node |
| 701 | OWD calculating unit |
| 800, 1600, 1700 | Transmitting node |
| 1304, 1404 | Bandwidth consumed for content data transmission |
| 1305, 1405 | Bandwidth consumed for redundant data transmission |
| 1601, 1603, 1701 | Router |
| 1602 | Network |
| 1610 | Streaming communication system |
| 1702 | Buffer |
| 1703, 1803, 1903 | Packet |

The invention claimed is:

1. A streaming communication device which transmits or receives a stream via a router over a packet-switched network, the streaming communication device comprising:

an accumulating unit configured to accumulate a one-way delay that is a time period between transmission and reception of a packet which includes part of the stream;

a detecting unit configured to determine presence of a sign of a packet loss when the one-way delay accumulated in the accumulating unit indicates a tendency toward an increase in a predetermined period;

an estimating unit configured to estimate, when the presence of the sign is determined, a loss packet using an amount of the increase in the one-way delay accumulated in the accumulating unit relative to an amount of change in time, the loss packet being a packet which will be lost;

a packet receiving unit configured to receive the packet; and a one-way delay (OWD) calculating unit configured to calculate the one-way delay that is a difference between a reception time and a transmission time of the packet, the transmission time being included in the packet, wherein, the accumulating unit is configured to accumulate the one-way delay calculated by the OWD calculating unit, the accumulating unit is configured to further accumulate at least one of the transmission time and the reception time, and when the presence of the sign is determined, the estimating unit is configured to estimate a packet loss time that is a time at which the packet loss will occur, the packet loss time being estimated from the following information which are accumulated in the accumulating unit: (i) the amount of the increase in the one-way delay; and (ii) at least one of the transmission time and the reception time, and when the one-way delay increases at a predetermined rate, the estimating unit is configured to estimate the packet loss time by adding, to either the transmission time or the reception time, a time it takes for the one-way delay to reach a one-way delay in a previous packet loss, and the predetermined rate is a rate of the increase in the one-way delay accumulated in the accumulating unit.

2. The streaming communication device according to claim 1, wherein the accumulating unit is configured to further accumulate a sequence number corresponding to the packet, and the estimating unit is configured to estimate a loss packet sequence number that is a sequence number corresponding to a packet which will be lost, the loss packet sequence number being estimated from the following information which are accumulated in the accumulating unit: (i) the amount of the increase in the one-way delay; (ii) the sequence number; and (iii) at least one of the transmission time and the reception time.

3. The streaming communication device according to claim 1, further comprising a control unit configured to control the estimated loss packet so as to recover, when the packet loss occurs, the part of the stream included in the packet which has been lost.

4. The streaming communication device according to claim 3, wherein the accumulating unit is configured to further accumulate at least one of a reception time and a transmission time of the packet, the transmission time being a time at which the packet has been transmitted, and when the presence of the sign is determined, the estimating unit is configured to estimate a packet loss time that is a time at which the packet loss will occur, the packet loss time being estimated from the following information which are accumulated in the accumulating unit: (i) the amount of the increase in the one-way delay; and (ii) at least one of the transmission time and the reception time.

5. The streaming communication device according to claim 4, wherein the control unit is configured to increase a proportion of redundant data included in a packet which is to be transmitted either at the estimated packet loss time or in a predetermined time period including the estimated packet loss time, so that the proportion of the redundant data is greater than a proportion of redundant data included in a packet which is to be transmitted either at a time other than the estimated packet loss time or at a time not included in the predetermined time period including the estimated packet loss time.

6. The streaming communication device according to claim 4, wherein the control unit is configured to perform control to cause transmission of (i) a packet which is to be transmitted either at the estimated packet loss time or in a predetermined time period including the estimated packet loss time, and (ii) a duplicate of the packet.

7. The streaming communication device according to claim 3, wherein the accumulating unit is configured to further accumulate a sequence number corresponding to the packet, and when the presence of the sign is determined, the estimating unit is configured to estimate a loss packet sequence number that is a sequence number corresponding to a packet which will be lost, the loss packet sequence number being estimated from the following information which are accumulated in the accumulating unit: (i) the sequence number; (ii) the amount of the increase in the one-way delay; and (iii) at least one of a transmission time and a reception time.

8. The streaming communication device according to claim 7, wherein the control unit is configured to increase a proportion of redundant data included in the packet corresponding to the estimated loss packet sequence number, so that the proportion of the redundant data is greater than a proportion of redundant data included in a packet corresponding to a sequence number other than the estimated loss packet sequence number.

9. The streaming communication device according to claim 7, wherein the control unit is configured to perform control to cause transmission of (i) the packet corresponding to the estimated loss packet sequence number and (ii) a duplicate of the packet.

10. The streaming communication device according to claim 1, wherein the detecting unit is configured to determine the presence of the sign when the number of periods in which the one-way delay continuously increases is equal to or greater than a predetermined first threshold.

11. The streaming communication device according to claim 10, wherein the detecting unit is configured to change the first threshold according to a value of a parameter related to the packet.

12. The streaming communication device according to claim 11, wherein the detecting unit is configured to increase the first threshold as a reception interval decreases, the reception interval being an interval at which the packet is received.

13. The streaming communication device according to claim 1, wherein the detecting unit is configured to determine whether or not an average of amounts of increase in the one-way delay in a predetermined time period is equal to or greater than a predetermined second threshold, and to determine the presence of the sign when determining that the average of the amounts of increase is equal to or greater than the second threshold.

14. The streaming communication device according to claim 1, wherein the streaming communication device transmits or receives the stream via a plurality of routers, and the estimating unit is configured to estimate the loss packet based on a one-way delay in a past packet loss that occurred in a router included in the plurality of routers.

15. A streaming communication method for transmitting or receiving a stream via a router over a packet-switched network, the streaming communication method comprising:
accumulating a one-way delay that is a time period between transmission and reception of a packet which includes a small segment of the stream;
determining presence of a sign of a packet loss when the one-way delay accumulated indicates a tendency toward an increase in a predetermined period; and
estimating, when the presence of the sign is determined, a loss packet using an amount of the increase in the one-way delay accumulated relative to an amount of change in time, the loss packet being a packet which will be lost;
receiving the packet; and
calculating the one-way delay that is a difference between a reception time and a transmission time of the packet, the transmission time being included in the packet,
wherein, the accumulating step accumulates the one-way delay calculated by the one-way delay calculating step, and further accumulates at least one of the transmission time and the reception time, and
when the presence of the sign is determined, the estimating step estimates a packet loss time that is a time at which the packet loss will occur, the packet loss time being estimated from the following information which are accumulated in the accumulating step: (i) the amount of the increase in the one-way delay; and (ii) at least one of the transmission time and the reception time, and
when the one-way delay increases at a predetermined rate, the estimating step is configured to estimate the packet loss time by adding, to either the transmission time or the reception time, a time it takes for the one-way delay to reach a one-way delay in a previous packet loss, and
the predetermined rate is a rate of the increase in the one-way delay accumulated in the accumulating step.

16. A streaming communication system, comprising:
a first streaming communication device which receives a stream via a router over a packet-switched network; and
a second streaming communication device which transmits the stream via the router over the packet-switched network,
the first streaming communication device including:
a one-way delay (OWD) calculating unit configured to calculate a one-way delay that is a difference between a reception time and a transmission time of a packet, the transmission time being a time at which the packet has been transmitted;
an accumulating unit configured to accumulate the one-way delay;
a detecting unit configured to determine presence of a sign of a packet loss when the one-way delay accumulated in the accumulating unit indicates a tendency toward an increase in a predetermined period;
an estimating unit configured to estimate, when the presence of the sign is determined, a loss packet using an amount of the increase in the one-way delay accumulated in the accumulating unit relative to an amount of change in time, the loss packet being a packet which will be lost; and
a packet receiving unit configured to receive the packet;
wherein, the accumulating unit is configured to accumulate the one-way delay calculated by the OWD calculating unit,
the accumulating unit is configured to further accumulate at least one of the transmission time and the reception time, and
when the presence of the sign is determined, the estimating unit is configured to estimate a packet loss time that is a time at which the packet loss will occur, the packet loss time being estimated from the following information which are accumulated in the accumulating unit: (i) the amount of the increase in the one-way delay; and (ii) at least one of the transmission time and the reception time, and
when the one-way delay increases at a predetermined rate, the estimating unit is configured to estimate the packet loss time by adding, to either the transmission time or the reception time, a time it takes for the one-way delay to reach a one-way delay in a previous packet loss, and
the predetermined rate is a rate of the increase in the one-way delay accumulated in the accumulating unit, and
the second streaming communication device including
a control unit configured to control the estimated loss packet so as to recover, when the packet loss occurs, part of the stream included in the packet which has been lost.

17. A streaming communication system, comprising:
a first streaming communication device which receives a stream via a router over a packet-switched network; and
a second streaming communication device which transmits the stream via the router over the packet-switched network,
the first streaming communication device including
a one-way delay (OWD) calculating unit configured to calculate a one-way delay that is a difference between a reception time and a transmission time of a packet, the transmission time being a time at which the packet has been transmitted, and
the second streaming communication device including:
an accumulating unit configured to accumulate the one-way delay;
a detecting unit configured to determine presence of a sign of a packet loss when the one-way delay accumulated in the accumulating unit indicates a tendency toward an increase in a predetermined period;
an estimating unit configured to estimate, when the presence of the sign is determined, a loss packet using an amount of the increase in the one-way delay accumulated in the accumulating unit relative to an amount of change in time, the loss packet being a packet which will be lost;
a control unit configured to control the estimated loss packet so as to recover, when the packet loss occurs, part of the stream included in the packet which has been lost; and
a packet receiving unit configured to receive the packet;
wherein, the accumulating unit is configured to accumulate the one-way delay calculated by the OWD calculating unit,
the accumulating unit is configured to further accumulate at least one of the transmission time and the reception time, and
when the presence of the sign is determined, the estimating unit is configured to estimate a packet loss time that is a time at which the packet loss will occur, the packet loss time being estimated from the following information which are accumulated in the accumulating unit: (i) the amount of the increase in the one-way delay; and (ii) at least one of the transmission time and the reception time, and when the one-way delay increases at a predetermined rate, the estimating unit is configured to estimate the packet loss time by adding, to either the transmission time or the reception time, a time it takes for the one-way delay to reach a one-way delay in a previous packet loss, and
the predetermined rate is a rate of the increase in the one-way delay accumulated in the accumulating unit.

\* \* \* \* \*